(12) United States Patent
Pani et al.

(10) Patent No.: US 9,713,125 B2
(45) Date of Patent: *Jul. 18, 2017

(54) METHOD AND APPARATUS PROVIDING FAST CONTROL CHANNEL FEEDBACK FOR MULTIPLE DOWNLINK CARRIER OPERATIONS

(71) Applicant: INTERDIGITAL PATENT HOLDINGS, INC., Wilmington, DE (US)

(72) Inventors: Diana Pani, Montreal (CA); Benoit Pelletier, Roxboro (CA); Lujing Cai, Morganville, NJ (US); Paul Marnier, Brossard (CA); Christopher R. Cave, Dollard-des-Ormeaux (CA); Rocco DiGirolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/867,508

(22) Filed: Apr. 22, 2013

(65) Prior Publication Data

US 2013/0235829 A1  Sep. 12, 2013

Related U.S. Application Data

(63) Continuation of application No. 12/650,022, filed on Dec. 30, 2009, now Pat. No. 8,457,091.

(Continued)

(51) Int. Cl.
  *H04W 72/04* (2009.01)
  *H04L 1/00* (2006.01)
  (Continued)

(52) U.S. Cl.
  CPC ....... *H04W 72/0406* (2013.01); *H04L 1/0026* (2013.01); *H04L 1/0027* (2013.01);
  (Continued)

(58) Field of Classification Search
  None
  See application file for complete search history.

(56) References Cited

U.S. PATENT DOCUMENTS

2005/0068990 A1\* 3/2005 Liu ............................... 370/516
2006/0268720 A1\* 11/2006 Rong .................... H04L 1/1692
                                                       370/236

(Continued)

FOREIGN PATENT DOCUMENTS

CN  101291162 A  10/2008
JP  2006-270788 A  10/2006
  (Continued)

OTHER PUBLICATIONS

3rd Generation Partnership Project (3GPP), R1-081546, "Initial Multi-Carrier HSPA Performance Evaluation", Ericsson, 3GPP TSG RAN WG1 Meeting #52bis, Shenzhen, China, Mar. 31-Apr. 4, 2008, 1-7.

(Continued)

*Primary Examiner* — Hicham Foud
*Assistant Examiner* — Saba Tsegaye
(74) *Attorney, Agent, or Firm* — Condo Roccia Koptiw LLP

(57) ABSTRACT

A method and apparatus for fast control channel feedback for multiple downlink carrier operations are disclosed. A wireless transmit/receive unit (WTRU) receives signals over a plurality of downlink carriers, generates feedback for each of the plurality of downlink carriers based on the received signals, and transmits via a plurality of antennas, the feedback for at least one of the plurality of downlink carriers (Continued)

over a first physical channel and feedback for another of the plurality of downlink carriers over a second physical channel.

14 Claims, 11 Drawing Sheets

Related U.S. Application Data

(60) Provisional application No. 61/141,605, filed on Dec. 30, 2008, provisional application No. 61/148,804, filed on Jan. 30, 2009, provisional application No. 61/256,173, filed on Oct. 29, 2009.

(51) Int. Cl.
*H04L 1/18* (2006.01)
*H04L 1/16* (2006.01)
*H04W 24/10* (2009.01)

(52) U.S. Cl.
CPC .......... *H04L 1/1671* (2013.01); *H04L 1/1812* (2013.01); *H04L 1/1854* (2013.01); *H04W 24/10* (2013.01)

(56) References Cited

U.S. PATENT DOCUMENTS

| | | | |
|---|---|---|---|
| 2007/0245201 A1 | 10/2007 | Sammour et al. | |
| 2008/0049669 A1 | 2/2008 | Lundby et al. | |
| 2008/0212615 A1* | 9/2008 | Ranta-Aho et al. | 370/498 |
| 2008/0253336 A1 | 10/2008 | Parkvall et al. | |
| 2009/0245212 A1 | 10/2009 | Sambhwani et al. | |
| 2010/0040002 A1* | 2/2010 | Lee et al. | 370/329 |
| 2011/0116530 A1* | 5/2011 | Sambhwani | 375/145 |

FOREIGN PATENT DOCUMENTS

| | | |
|---|---|---|
| JP | 2007-235976 A | 9/2007 |
| JP | 2009-508368 A | 2/2009 |
| JP | 2012-51440 A | 6/2012 |
| WO | WO 2006/120524 A1 | 11/2006 |
| WO | WO 2007-013942 A1 | 2/2007 |
| WO | WO 2008/024889 A2 | 2/2008 |
| WO | WO 2009/120797 A1 | 10/2009 |
| WO | WO 2010-078425 A1 | 7/2010 |

OTHER PUBLICATIONS

3rd Generation Partnership Project (3GPP), R1-083539, "Single Code HS-DPCCH ACK/NACK Design for DC-HSDPA", Qualcomm Europe, 3GPP TSG-RAN WG1 #54-bis Prague, Czech Republic, Sep. 28-Oct. 3, 2008, 1-17.
3rd Generation Partnership Project (3GPP), R1-083540, "Single Code HS-DPCCH CQI Design for DC-HSDPA", Qualcomm Europe, 3GPP TSG-RAN WG1 #54-bis Prague, Czech Republic, Sep. 28-Oct. 3, 2008, 1-9.
3rd Generation Partnership Project (3GPP), R1-084690, "Introduction of Dual-Cell HSDPA Operation on Adjacent Carriers", Huawei, Change Request, 25.212 CR 0267, rev 5, Current version: 8.3.0, 3GPP TSG-RAN WG1 Meeting #54bis, Prague, Czech Republic, Sep. 29-Oct. 3, 2008, 101 pages.
3rd Generation Partnership Project (3GPP), R1-094068, "HS-DPCCH ACK/NACK Code Book Design for 4C-HSDPA", Qualcomm Europe, 3GPP TSG RAN WG1 Meeting #58bis Miyazaki, Japan, Oct. 12-16, 2009, 1-57.
3rd Generation Partnership Project (3GPP), R2-081899, "Dual Cell HSDPA Operation Consideration", Huawei, 3GPP TSG-RAN WG2 #61bis, Shenzhen, China, Mar. 31-Apr. 4, 2008, 1-2.
3rd Generation Partnership Project (3GPP), RP-090976, "Four Carrier HSDPA", Work Item Description, Sep. 2009, 6 pages.
3rd Generation Partnership Project (3GPP), Tdoc R1-082532, "Control Channel Support for HSDPA Dual-Cell Operation", Philips, NXP, 3GPP TSG RAN WG1 Meeting #53bis Warsaw, Poland, Jun. 30-Jul. 4, 2008, 4 pages.
3rd Generation Partnership Project (3GPP), TS 25.211 V8.3.0, "Technical Specification Group Radio Access Network, Physical Channels and Mapping of Transport Channels onto Physical Channels (FDD) (Release 8)", Dec. 2008, 1-56.
3rd Generation Partnership Project (3GPP), TS 25.211 V8.6.0, "Technical Specification Group Radio Access Network, Physical Channels and Mapping of Transport Channels onto Physical Channels (FDD) (Release 8)", Dec. 2009, 1-58.
3rd Generation Partnership Project (3GPP), TS 25.211 V9.1.0, "Technical Specification Group Radio Access Network, Physical Channels and Mapping of Transport Channels onto Physical Channels (FDD) (Release 9)", Dec. 2009, 1-58.
3rd Generation Partnership Project (3GPP), TS 25.212 V8.4.0, "Technical Specification Group Radio Access Network, Multiplexing and Channel Coding (FDD) (Release 8)", Dec. 2008, 1-107.
3rd Generation Partnership Project (3GPP), TS 25.212 V9.1.0, "Technical Specification Group Radio Access Network, Multiplexing and Channel Coding (FDD) (Release 9)", Dec. 2009, 1-108.
3rd Generation Partnership Project (3GPP), TS 25.331 V8.4.0, "Technical Specification Group Radio Access Network, Radio Resource Control (RRC), Protocol Specification (Release 8)", Sep. 2008, 1-1543.
3rd Generation Partnership Project (3GPP), TS 25.331 V9.0.0, "Technical Specification Group Radio Access Network, Radio Resource Control (RRC), Protocol Specification (Release 9)", Sep. 2009, 1-1710.
Johansson, et al., "Multi-Carrier HSPA Evolution", Ericsson Research, Dec. 2008, 1-5.
Seidel et al., "White Paper—Dual Cell HSDPA and its Future Evolution", Nomor Research GMBH, Munich, Germany, Jan. 2009, 1-5.
Seidel, Eiko "Standardisation Updates on HSPA Evolution", Nomor Research, GMBH, Munich, Germany, Mar. 2009, 1-3.
$3^{rd}$ Generation Partnership Project (3GPP), R1-061954, "CQI for Rel-7 FDD MIMO scheme", Philips, 3GPP TSG TAN WG1, Meeting #46, Tallinn, Estonia, Aug. 28-Sep. 1, 2006, 3 pages.
$3^{rd}$ Generation Partnership Project (3GPP), R1-083975, "On the HS-DPCCH structure for Dual-Cell HSDPA operation", Ericsson, 3GPP TSG TAN WG1, Meeting #54bis, Prague, Czech Republic, Sep. 29-Oct. 3, 2008, 10 pages.
$3^{rd}$ Generation Partnership Project (3GPP), R1-083730, "L1 control signaling with carrier aggregation in LTE-Advanced", Nokia, Nokia Siemens Networks, 3 GPP TSG-RAN WG1, Meeting #54bis, Prague, Czech Republic, Sep. 29-Oct. 3, 2008, 7 pages.
$3^{rd}$ Generation Partnership Project (3GPP), R1-084197, "Considerations on DL/UL Transmission in Asymmetric Carrier Aggregation", LG Electronics, 3 GPP TSG-RAN WG1, Meeting #55, Prague, Czech Republic, Nov. 10-14, 2008, 5 pages.

* cited by examiner

METHOD AND APPARATUS PROVIDING FAST CONTROL CHANNEL FEEDBACK FOR MULTIPLE DOWNLINK CARRIER OPERATIONS

CROSS REFERENCE TO RELATED APPLICATIONS

This application is a continuation of U.S. patent application Ser. No. 12/650,022 filed Dec. 30, 2009, which issued as U.S. Pat. No. 8,457,091 on Jun. 4, 2013, and which claims the benefit of U.S. provisional application Nos. 61/141,605 filed Dec. 30, 2008, 61/256,173 filed Oct. 29, 2009, and 61/148,804 filed Jan. 30, 2009 , all of which are hereby incorporated by reference as if fully set forth herein.

FIELD OF INVENTION

This application is related to wireless communications.

BACKGROUND

Personal communications devices with advanced data capabilities and data cards allow mobile computers to connect to the internet wirelessly. These devices create an increasing demand for higher data rate and bandwidth to wireless service providers and operators. To meet these needs, wireless communication systems may use multiple carriers for the transmission of data. A wireless communication systems that uses multiple carriers for the transmission of data may be referred to as a multi-carrier system. The use of multiple carriers is expanding in both cellular and non-cellular wireless systems.

A multi-carrier system may increase the bandwidth available in a wireless communication system according to a multiple of how many carriers are made available. For instance, a dual-carrier system may double the bandwidth when compared to a single carrier system and tri-carrier system may triple the bandwidth when compared to a single carrier system. In addition to this throughout gain, diversity and joint scheduling gains may also be expected. This may result in improving the quality of service (QoS) for end users. Further, the use of multiple carriers may be used in combination with multiple-input multiple-output (MIMO).

As a response to this increased demand in bandwidth, wireless technology continues to evolve. For example, as part of the 3rd Generation Partnership Project (3GPP) specifications, simultaneous use of two High-Speed Downlink Packet Access (HSDPA) downlink carriers has been introduced. In this setup, a base station (which may also be referred to as a Node-B, an access point, site controller, etc. in other variations or types of communications networks) communicates to a wireless transmit/receive unit (WTRU) over two downlink carriers simultaneously. This not only may double the bandwidth and the peak data rate available to WTRUs, but also may increase the network efficiency by means of fast scheduling and fast channel feedback over two carriers. This dual-carrier HSDPA (DC-HSDPA) so far only offers a limited set of HSDPA functionality as it does not support MIMO.

As the data usage continues to increase rapidly, communication systems may use more than two downlink carriers. Multi-carrier operations are proposed to allow multi-carrier aggregation. Multi-carrier operations may allow the WTRU and network to receive/transmit on two or more carriers.

While for dual-carrier the Hybrid automatic repeat request (HARQ) acknowledgment codebook has been specified, a codebook and associated feedback mechanism for more than two carriers is desired.

SUMMARY

A method and apparatus for fast control channel feedback for multiple downlink carrier operations are disclosed. A WTRU receives signals over a plurality of downlink carriers, generates feedback for each of the plurality of downlink carriers based on the received signals and transmits, via a plurality of antennas, the feedback for at least one of the plurality of downlink carriers over a first physical channel and feedback for another of the plurality of downlink carriers over a second physical channel.

BRIEF DESCRIPTION OF THE DRAWINGS

A more detailed understanding may be had from the following description, given by way of example in conjunction with the accompanying drawings wherein.

DETAILED DESCRIPTION

Figure 1:
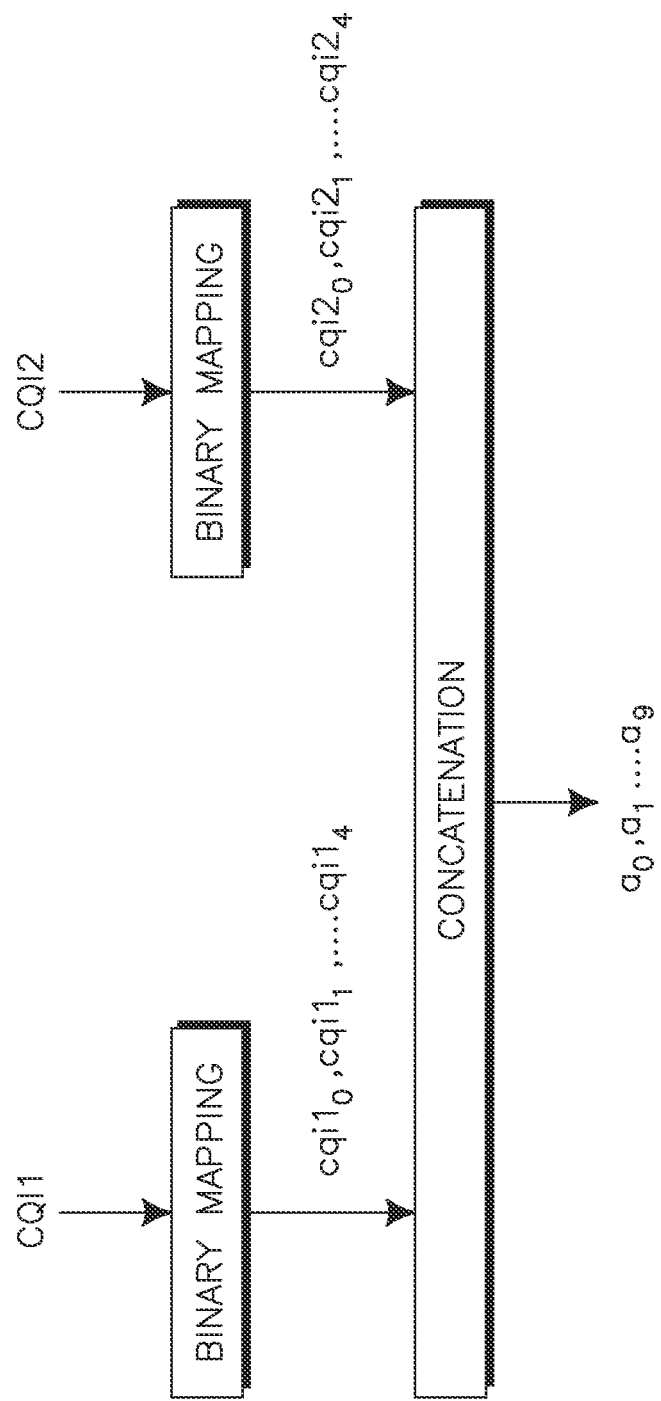
FIG. 1 shows a composite CQI report.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "base station" includes but is not limited to a Node-B, a site controller, an access point (AP), or any other type of interfacing device capable of operating in a wireless environment.

The network may assign at least one downlink (DL) and/or at least one uplink (UL) carrier as an anchor downlink carrier and an anchor uplink carrier, respectively. In multi-carrier operation a WTRU may be configured to operate with two or more carriers or also referred to as frequencies. Each of these carriers may have distinct characteristics and logical association with the network and the WTRU, and the operating frequencies may be grouped and referred to as anchor or primary carrier and supplementary and secondary carrier. Hereinafter, the terminologies "anchor carrier" and "primary carrier", and "supplementary carrier" and "secondary carrier" will be used interchangeably, respectively. "Anchor carrier" may also refer to a "primary uplink frequency" in the uplink and "primary downlink frequency in the downlink." Similarly, "supplementary carrier" may also refer to a "secondary uplink frequency" in the uplink and "secondary downlink frequency in the downlink." If more than two carriers are configured, the WTRU may contain more than one primary carrier and/or more than one secondary carrier(s). The embodiments described herein are applicable and may be extended to these scenarios as well. For example, the anchor carrier may be defined as the carrier for carrying a specific set of control information for downlink/uplink transmissions. Any carrier that is not assigned as an anchor carrier may be a supplementary carrier. Alternatively, the network may not assign an anchor carrier and no priority, preference, or default status may be given to any downlink or uplink carriers. For multi-carrier operation more than one supplementary carriers or secondary carriers may exist.

The DL feedback for up to two carriers or for up to two streams in case of MIMO configuration with single MIMO carrier may be implemented. An example of DL feedback includes the High Speed Dedicated Physical Control Channel (HS-DPCCH), which is used to transmit ACK/NACK information and Channel Quality Indicator (CQI) for each carrier. The ACK/NACK info is jointly coded and transmitted over one HS-DPCCH.

Table 1 shows an example channel coding of HARQ-ACK in case dual-carrier is configured. The composite HARQ acknowledgement message to be transmitted may be coded to ten bits as shown in the Table 1. The output is denoted as $w_0, w_1, \ldots, w_9$.

TABLE 1

| | | HARQ-ACK message to be transmitted | | | | | | | | | |
|---|---|---|---|---|---|---|---|---|---|---|---|
| | | $w_0$ | $w_1$ | $w_2$ | $w_3$ | $w_4$ | $w_5$ | $w_6$ | $w_7$ | $w_8$ | $w_9$ |
| HARQ-ACK when WTRU detects a single scheduled transport block (TB) on the serving HS-DSCH cell | | | | | | | | | | | |
| ACK | | 1 | 1 | 1 | 1 | 1 | 1 | 1 | 1 | 1 | 1 |
| NACK | | 0 | 0 | 0 | 0 | 0 | 0 | 0 | 0 | 0 | 0 |
| HARQ-ACK when WTRU detects a single scheduled TB on the secondary serving HS-DSCH cell | | | | | | | | | | | |
| ACK | | 1 | 1 | 1 | 1 | 1 | 0 | 0 | 0 | 0 | 0 |
| NACK | | 0 | 0 | 0 | 0 | 0 | 1 | 1 | 1 | 1 | 1 |
| HARQ-ACK when WTRU detects a single scheduled TB on each of the serving and secondary serving HS-DSCH cells | | | | | | | | | | | |
| Response to TB from serving HS-DSCH cell | Response to TB from secondary serving HS-DSCH cell | | | | | | | | | | |
| ACK | ACK | 1 | 0 | 1 | 0 | 1 | 0 | 1 | 0 | 1 | 0 |
| ACK | NACK | 1 | 1 | 0 | 0 | 1 | 1 | 0 | 0 | 1 | 1 |
| NACK | ACK | 0 | 0 | 1 | 1 | 0 | 0 | 1 | 1 | 0 | 0 |
| NACK | NACK | 0 | 1 | 0 | 1 | 0 | 1 | 0 | 1 | 0 | 1 |
| PRE/POST indication | | | | | | | | | | | |
| PRE | | 0 | 0 | 1 | 0 | 0 | 1 | 0 | 0 | 1 | 0 |
| POST | | 0 | 1 | 0 | 0 | 1 | 0 | 0 | 1 | 0 | 0 |

FIG. 1 shows a composite CQI report. The composite CQI report is constructed from two individual CQI reports that are represented by CQI1 and CQI2. CQI1 corresponds to the CQI associated to a serving High-Speed Downlink Shared Channel (HS-DSCH) cell, and CQI2 corresponds to the CQI associated to a secondary serving HS-DSCH cell. The two individual CQI reports are concatenated to form the composite channel quality indication according to the following relation:

$(a_0 a_1 a_2 a_3 a_4 a_5 a_6 a_7 a_8 a_9) = $
$(cqi1_0 cqi1_1 cqi1_2 cqi1_3 cqi1_4 cqi2_0 cqi2_1 cqi2_2 cqi2_3 cqi2_4)$ In addition to multi-carrier communication, MIMO is a technique for improving wireless capacity and range by using spatial multiplexing. MIMO uses multiple antennas to send information. In addition to two ACK/NACKs for potentially two data streams and the combined CQI, a WTRU operating in MIMO mode also needs to transmit the precoding control information (PCI).

Figure 2:
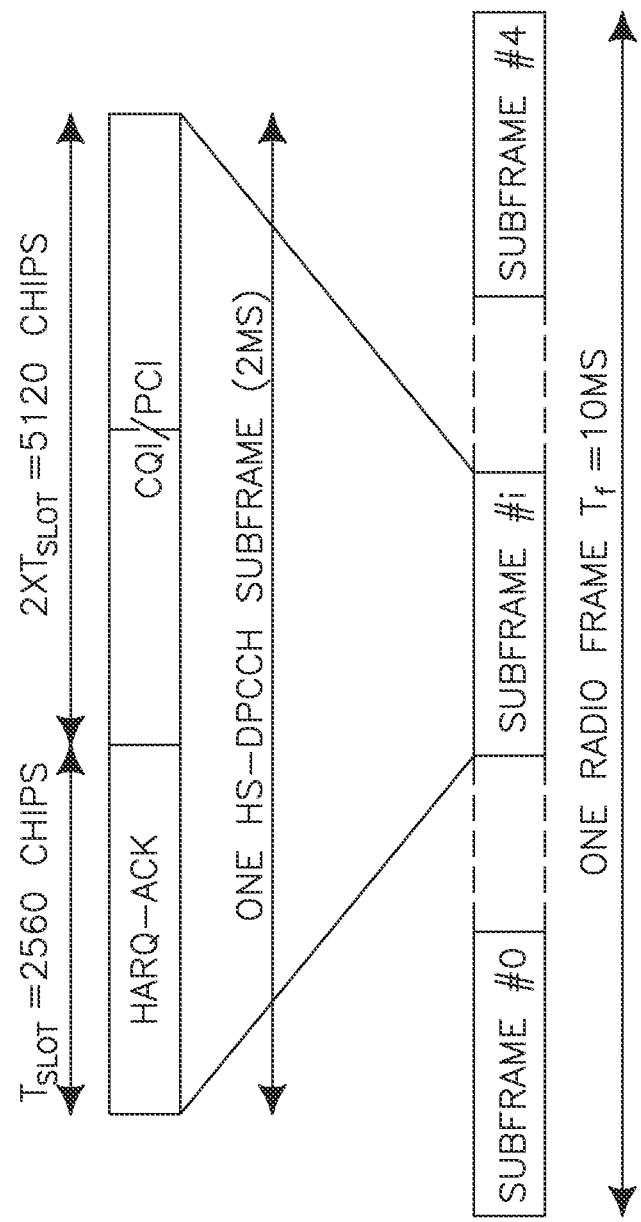
FIG. 2 shows an HS-DPCCH frame structure.

FIG. 2 shows an HS-DPCCH frame structure. The HS-DPCCH may carry uplink feedback information related to downlink HS-DSCH transmission. This feedback information is carried on the uplink HS-DPCCH. As shown in FIG. 2, the feedback information may include a HARQ-ACK field and a CQI. Each sub-frame of 2 ms may include, for example, three slots. The HARQ-ACK field, for example, may be included in a first slot. The HARQ-ACK field carries the ACK/NACK information The CQI field, which carries the channel quality indication, may use two slots. A 10 ms radio frame, for example, may include five sub-frames.

The introduction of multi-carrier operation introduces the need for additional feedback mechanism. If the network is transmitting in more than two carriers simultaneously, the WTRU needs to be capable of acknowledging all carriers and also sending CQI feedback for all configured carriers.

Additionally, the current HARQ acknowledgment codebook only allows a WTRU to provide DL feedback for up to two carriers or for up to four streams in total in cases that MIMO is configured in conjunction with the dual-carrier operation.

The composite HARQ acknowledgement message to be transmitted may be coded to 10 bits as shown in Table 2, which is the codebook table used for when dual-carrier downlink operation is combined with MIMO. Here 'A' means 'ACK', 'N' means 'NACK' and 'D' means 'no transmission' ('i.e. discontinuous transmission (DTX)). 'AA', 'AN', 'NA' and 'NN' refer to feedback for dual-stream transmission in a cell. For example, 'AN' means ACK on the primary stream and NACK on the secondary stream. The output is denoted as $w_0, w_1, \ldots w_9$.

Table 2 shows channel coding of HARQ-ACK in case both dual-carrier and MIMO are configured.

downlink transmissions are handled using multiple carriers 270. The wireless communication system 200 includes a plurality of WTRUs 210, a Node-B 220, a CRNC 230, a SRNC 240, and a core network 250. The Node-B 220 and the CRNC 230 may collectively be referred to as the UTRAN.

Figure 3:
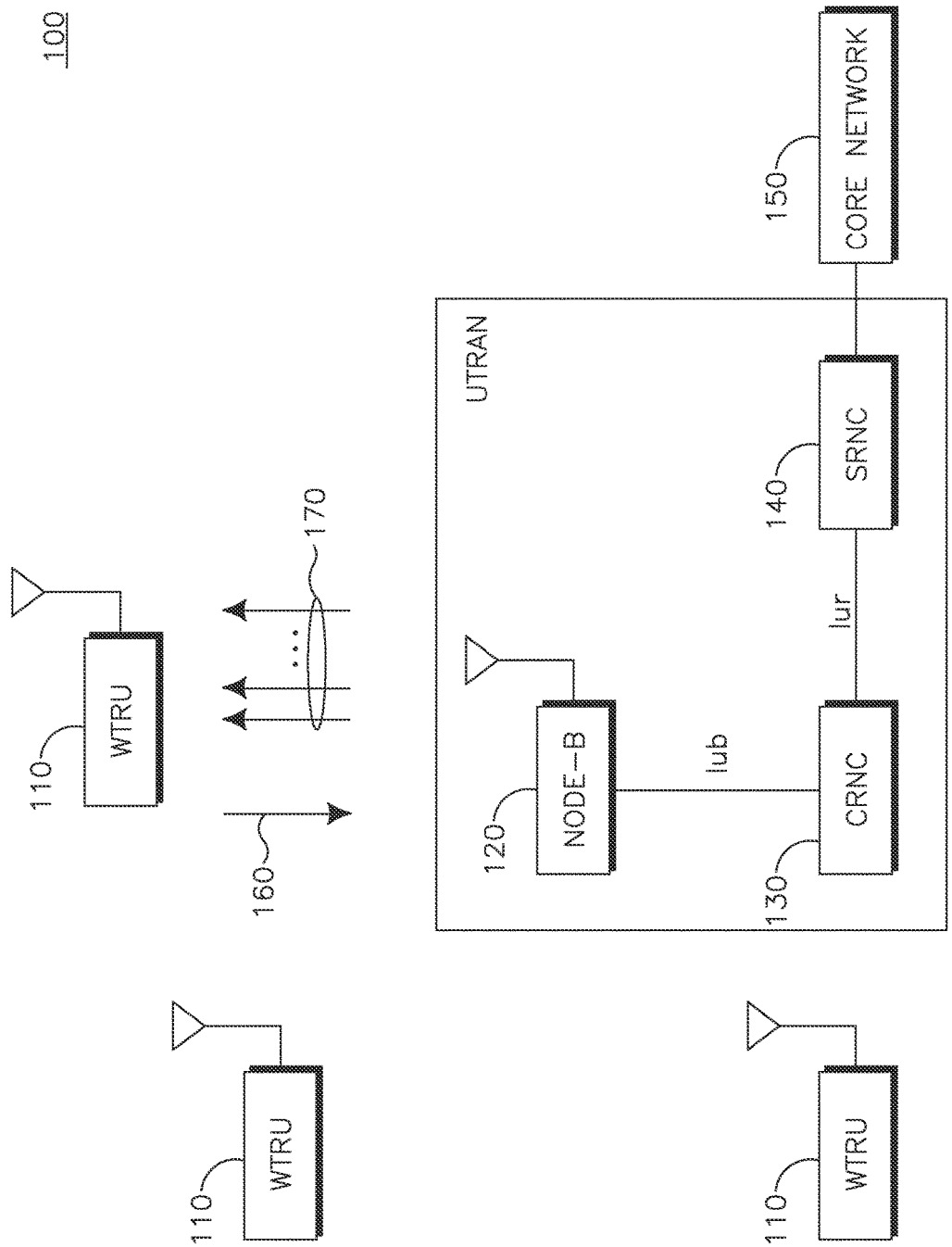
FIG. 3 shows an example wireless communication system where uplink transmissions are handled with a single carrier and downlink transmissions are handled using multiple carriers.
Figure 4:
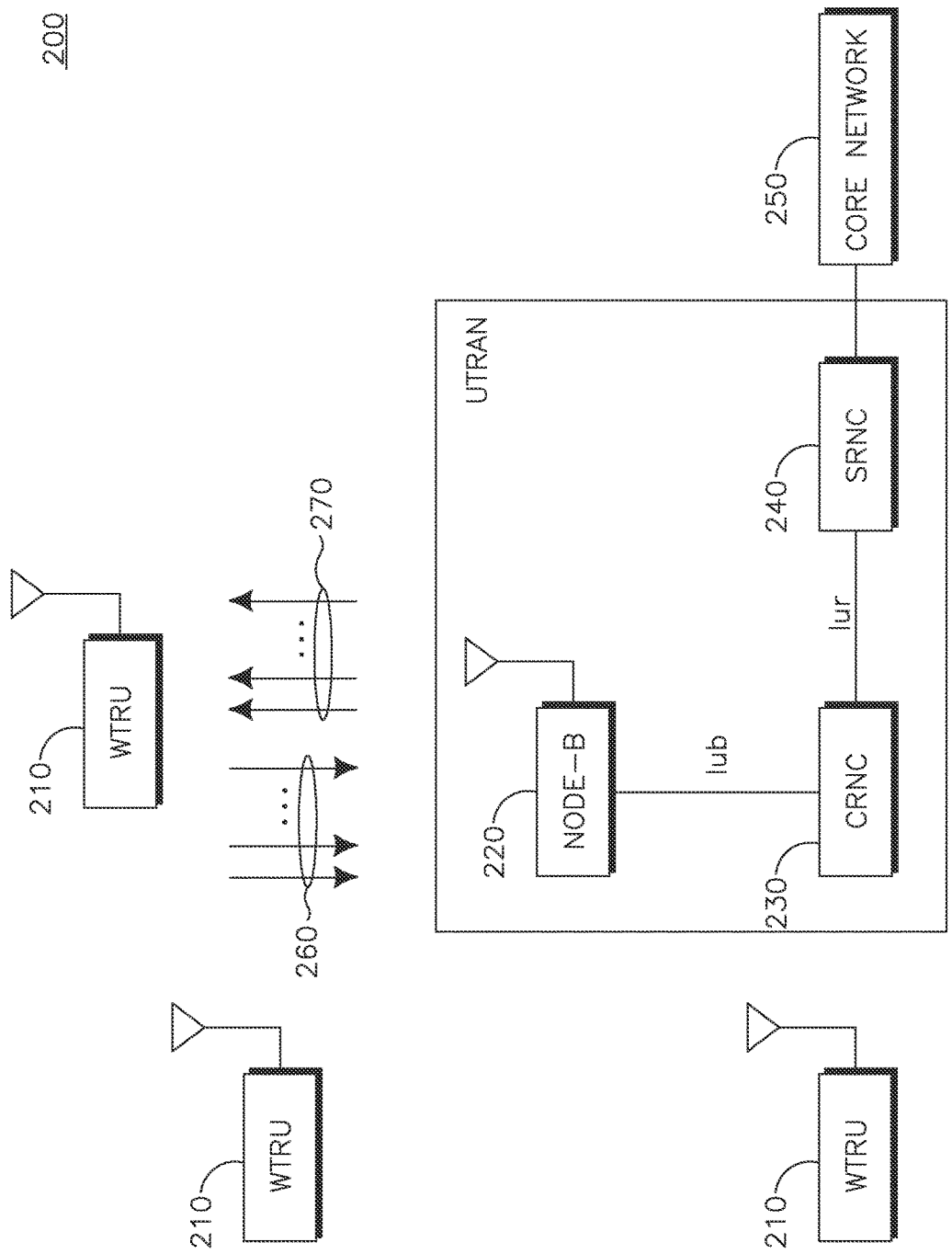
FIG. 4 shows an example wireless communications system where uplink transmissions are handled using multiple carriers and downlink transmissions are handled using multiple carriers.

As shown in FIG. 4, the WTRUs 210 are in communication with the Node-B 220, which is in communication with the CRNC 230 and the SRNC 240. Although three WTRUs 210, one Node-B 220, one CRNC 230, and one SRNC 240 are shown in FIG. 3, it should be noted that any combination of wireless and wired devices may be included in the wireless communication system 200.

Figure 5:
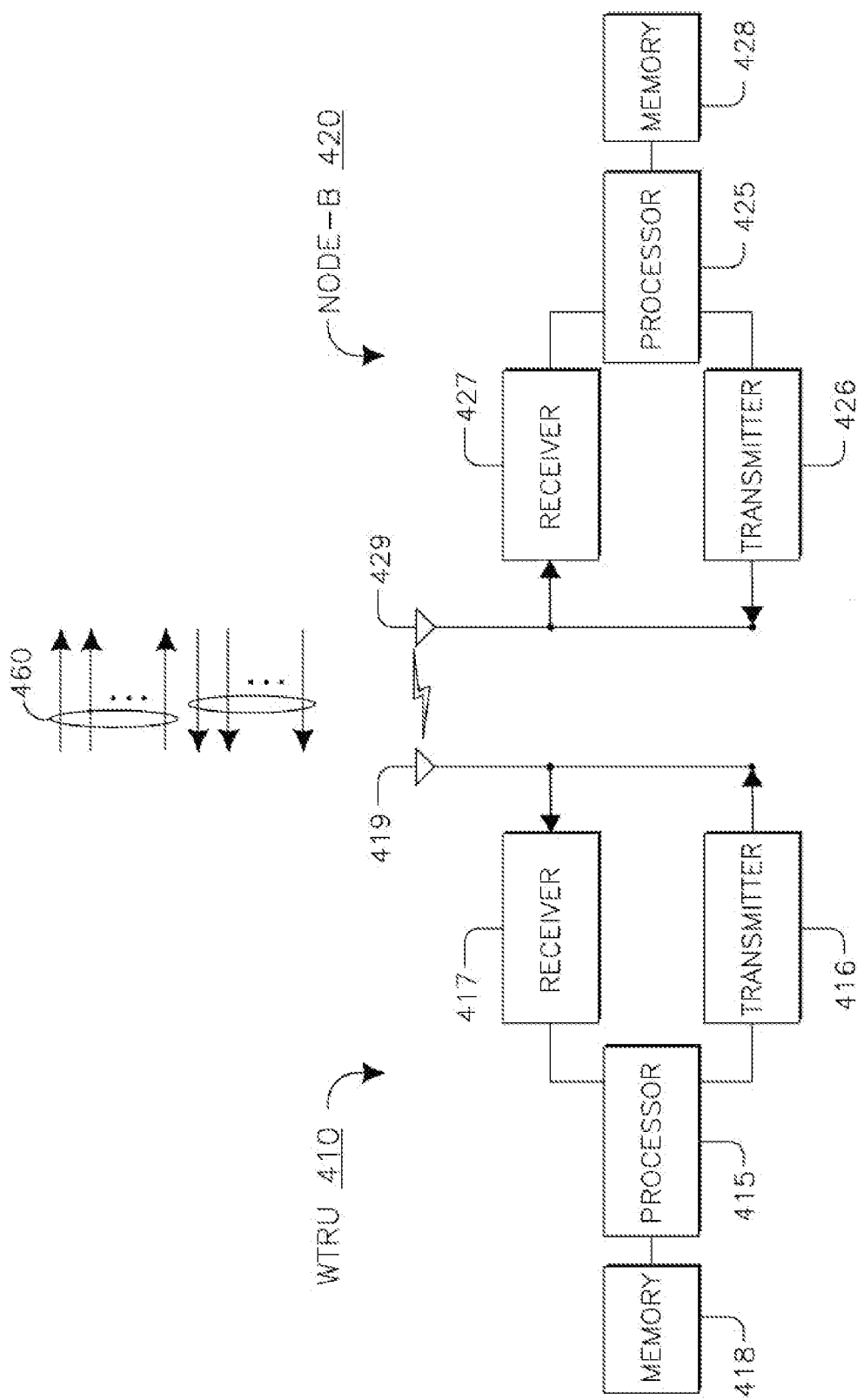
FIG. 5 is a functional block diagram of the WTRU and the Node-B of the wireless communication system of FIG. 4.

FIG. 5 is a functional block diagram of the WTRU 410 and the Node-B 420 of the wireless communication system 200 of FIG. 4. As shown in FIG. 5, the WTRU 410 is in communication with the Node-B 420 and both are configured to perform a method wherein uplink transmissions from the WTRU 410 are transmitted to the Node-B 420 using multiple uplink carriers 460. The WTRU 410 includes a

TABLE 2

| A/D | 1 | 1 | 1 | 1 | 1 | 1 | 1 | 1 | 1 | 1 | AA/A | 0 | 1 | 1 | 0 | 0 | 0 | 0 | 1 | 0 | 0 |
|---|---|---|---|---|---|---|---|---|---|---|---|---|---|---|---|---|---|---|---|---|---|
| N/D | 0 | 0 | 0 | 0 | 0 | 0 | 0 | 0 | 0 | 0 | AA/N | 1 | 1 | 0 | 0 | 0 | 1 | 1 | 0 | 1 | 0 |
| AA/D | 1 | 0 | 1 | 0 | 1 | 1 | 1 | 1 | 0 | 1 | AN/A | 1 | 0 | 1 | 1 | 1 | 0 | 0 | 1 | 1 | 0 |
| AN/D | 1 | 1 | 0 | 1 | 0 | 1 | 0 | 1 | 1 | 1 | AN/N | 0 | 0 | 1 | 1 | 0 | 1 | 0 | 0 | 0 | 1 |
| NA/D | 0 | 1 | 1 | 1 | 1 | 0 | 1 | 0 | 1 | 1 | NA/A | 0 | 1 | 0 | 1 | 1 | 1 | 1 | 1 | 0 | 0 |
| NN/D | 1 | 0 | 0 | 1 | 0 | 0 | 1 | 0 | 0 | 0 | NA/N | 1 | 1 | 0 | 0 | 1 | 0 | 0 | 0 | 0 | 1 |
| D/A | 0 | 0 | 0 | 0 | 0 | 1 | 1 | 1 | 1 | 1 | NN/A | 0 | 0 | 0 | 0 | 1 | 1 | 0 | 0 | 1 | 0 |
| D/N | 1 | 1 | 1 | 1 | 1 | 1 | 0 | 0 | 0 | 0 | NN/N | 0 | 1 | 0 | 0 | 0 | 1 | 1 | 0 | 0 | 1 |
| D/AA | 1 | 0 | 0 | 0 | 1 | 0 | 0 | 0 | 1 | 1 | AA/AA | 0 | 1 | 1 | 0 | 1 | 1 | 0 | 1 | 1 | 1 |
| D/AN | 0 | 1 | 0 | 0 | 0 | 0 | 1 | 1 | 0 | 1 | AA/AN | 1 | 0 | 1 | 1 | 0 | 0 | 1 | 1 | 1 | 1 |
| D/NA | 0 | 0 | 0 | 1 | 1 | 1 | 1 | 1 | 1 | 0 | AA/NA | 1 | 1 | 0 | 1 | 1 | 1 | 1 | 0 | 0 | 1 |
| D/NN | 1 | 1 | 1 | 1 | 0 | 0 | 1 | 0 | 0 | 0 | AA/NN | 0 | 1 | 1 | 1 | 0 | 1 | 1 | 1 | 0 | 0 |
| A/A | 1 | 1 | 0 | 1 | 0 | 0 | 0 | 0 | 1 | 1 | AN/AA | 0 | 0 | 0 | 1 | 1 | 0 | 0 | 1 | 0 | 1 |
| A/N | 0 | 0 | 1 | 1 | 1 | 0 | 1 | 0 | 0 | 1 | AN/AN | 1 | 1 | 1 | 0 | 0 | 0 | 0 | 0 | 0 | 1 |
| N/A | 1 | 0 | 0 | 1 | 0 | 1 | 1 | 1 | 0 | 0 | AN/NA | 1 | 0 | 0 | 0 | 0 | 1 | 0 | 1 | 0 | 0 |
| N/N | 0 | 1 | 1 | 0 | 0 | 1 | 0 | 1 | 0 | 1 | AN/NN | 0 | 0 | 1 | 1 | 0 | 1 | 0 | 0 | 0 | 1 |
| A/AA | 1 | 0 | 1 | 0 | 0 | 1 | 1 | 0 | 0 | 0 | NA/AA | 1 | 1 | 0 | 0 | 1 | 0 | 1 | 1 | 1 | 0 |
| A/AN | 1 | 0 | 0 | 1 | 0 | 1 | 0 | 1 | 0 | 1 | NA/AN | 0 | 0 | 1 | 0 | 1 | 0 | 1 | 0 | 0 | 0 |
| A/NA | 0 | 0 | 1 | 1 | 1 | 0 | 1 | 0 | 0 | 1 | NA/NA | 1 | 0 | 1 | 1 | 1 | 1 | 0 | 0 | 1 | 0 |
| A/NN | 0 | 1 | 1 | 1 | 0 | 1 | 0 | 0 | 1 | 1 | NA/NN | 1 | 1 | 1 | 0 | 0 | 1 | 1 | 0 | 1 | 0 |
| N/AA | 1 | 0 | 1 | 0 | 0 | 1 | 0 | 1 | 1 | 0 | NN/AA | 0 | 1 | 0 | 1 | 0 | 0 | 0 | 0 | 1 | 0 |
| N/AN | 1 | 1 | 0 | 0 | 0 | 1 | 0 | 1 | 1 | 0 | NN/AN | 0 | 0 | 1 | 0 | 0 | 0 | 0 | 1 | 1 | 0 |
| N/NA | 0 | 1 | 1 | 0 | 1 | 0 | 1 | 0 | 1 | 0 | NN/NA | 0 | 1 | 0 | 0 | 1 | 1 | 0 | 0 | 0 | 0 |
| N/NN | 0 | 0 | 1 | 0 | 1 | 1 | 0 | 1 | 0 | 1 | NN/NN | 0 | 0 | 0 | 0 | 0 | 1 | 1 | 0 | 1 | 1 |
| PRE/POST | | | | | | | | | | | | | | | | | | | | | | |
| PRE | 0 | 0 | 1 | 0 | 0 | 1 | 0 | 0 | 1 | 0 | POST | 0 | 1 | 0 | 0 | 1 | 0 | 0 | 1 | 0 | 0 |

FIG. 3 shows an example wireless communication system 100 where uplink transmissions are handled with a single carrier 160 and downlink transmissions are handled using multiple carriers 170. The wireless communication system 100 includes a plurality of WTRUs 110, a Node-B 120, a controlling radio network controller (CRNC) 130, a serving radio network controller (SRNC) 140, and a core network 150. The Node-B 120 and the CRNC 130 may collectively be referred to as the UMTS Terrestrial Radio Access Network (UTRAN).

As shown in FIG. 3, the WTRUs 110 are in communication with the Node-B 120, which is in communication with the CRNC 130 and the SRNC 140. Although three WTRUs 110, one Node-B 120, one CRNC 130, and one SRNC 140 are shown in FIG. 2, it should be noted that any combination of wireless and wired devices may be included in the wireless communication system 100.

FIG. 4 shows an example wireless communications system 200 according to an example embodiment where uplink transmissions are handled using multiple carriers 260 and processor 415, a transmitter 416, a receiver 417, a memory 418, an antenna 419, and other components (not shown) that may be found in a typical WTRU. The antenna 419 may include a plurality of antenna elements or plurality of antennas may be included in the WTRU 410. The memory 418 is provided to store software including operating system, application, and other similar uses. The processor 415 is provided to perform, alone or in association with software and/or any one or more of the components, a method of performing uplink transmissions with multiple uplink carriers. The receiver 417 and the transmitter 416 are in communication with the processor 415. The receiver 417 and the transmitter 416 are capable of receiving and transmitting one or more carriers simultaneously. Alternatively, multiple receivers and/or multiple transmitters may be included in the WTRU 410. The antenna 419 is in communication with both the receiver 417 and the transmitter 416 to facilitate the transmission and reception of wireless data.

The Node-B 420 includes a processor 425, a transmitter 426, a receiver 427, a memory 428, an antenna 429, and other components (not shown) that may be found in a typical base station. The antenna 429 may include a plurality of antenna elements or plurality of antennas may be included in the Node-B 420. The memory 428 is provided to store software including operating system, application, and other similar uses. The processor 425 is provided to perform, alone or in association with software and/or any one or more of the components, a method wherein uplink transmissions from the WTRU 410 are transmitted to the Node-B 420 using multiple uplink carriers in accordance with embodiments disclosed hereafter. The receiver 427 and the transmitter 426 are in communication with the processor 425. The receiver 427 and the transmitter 426 are capable of receiving and transmitting one or more carriers simultaneously. Alternatively, multiple receivers and/or multiple transmitters may be included in the Node-B 420. The antenna 429 is in communication with both the receiver 427 and the transmitter 426 to facilitate the transmission and reception of wireless data.

It is also noted that although the embodiments described herein are described with reference to channels associated with 3GPP Releases 4 through 9, it should be noted that the embodiments are applicable to further 3GPP releases (and the channels used therein) such as 3GPP Long Term Evolution (LTE) as well as any other type of wireless communication system, and the channels used therein. It should also be noted that the embodiments described herein may be applicable in any order or in any combination.

Feedback mechanisms and methods to allow/enable reception of multiple downlink transmissions and increase the efficiency of multi-carrier operation are disclosed herein. The different embodiments described may be used individually or in any combination.

In one embodiment, when a WTRU 410 is configured with dual-carrier operation in the UL, the WTRU 410 may also be configured with a primary/anchor UL carrier and a supplementary UL carrier. The anchor/primary UL carrier may be referred to as the UL carrier that is associated to the anchor DL carrier. Depending on the dual cell UL operation, the WTRU 410 may be configured with two DL cells that consist of the same set of channels as a previously defined serving HS-DSCH cell (i.e., Fractional Dedicated Channel (F-DPCH), Enhanced-Dedicated Channel (E-DCH) HARQ Acknowledgement Indicator Channel (E-HIGH), E-DCH Relative Grant Channel (E-RGCH), and E-DCH Absolute Grant Channel (E-AGCH)). The WTRU 410 may be configured with two anchor or two primary cells, each associated to an UL carrier. If one of these two anchors contains a bigger subset of channels, this cell may also be referred to as the main anchor carrier and the other carrier may be referred to as the secondary anchor carrier.

The methods described hereafter describe multi-carrier downlink operation for three carriers or four carriers. It is understood that these carrier may be in the same band or in different bands. Further, it is important to note that multi-carrier operation may apply to more than four carriers.

The network may configure a WTRU 410 with multiple carriers (e.g., carrier-1 through carrier-n). For each carrier, there may be associated feedback messages (e.g., HARQ1-n and CQI1-n), respectively. When described hereafter, the carriers are labeled 1 to n. However, the labeling of the carriers does not mean that the carriers are labeled in the order of their frequency allocation. The cell/frequency may be mapped to carrier-1 to carrier-n according to any one or a combination of the following: explicit configuration by the network where each frequency is explicitly indicated by the carrier number (e.g., carrier-1 to carrier-n may be numbered according to the order provided by the configuration); carrier-1 to carrier-n may be numbered according to frequency value (or channel number, e.g., using the Universal Terrestrial Radio Access (UTRA) Absolute Radio Frequency Channel Number (UARFCN)) in increasing or decreasing order; the first carrier may always correspond to the anchor carrier; the first two carriers may correspond to two anchor carriers; the odd numbered carriers may correspond to anchor carriers when more than one anchor carrier is configured; or carriers may be configured according to frequency band.

The WTRU 410 may be configured to use dual and single carrier uplink control channels (e.g., HS-DPCCH). In one embodiment, the WTRU 410 is configured to provide feedback for additional DL carriers on additional uplink control channels. For example, when a WTRU 410 is configured with dual-carrier operation in the UL, the WTRU 410 may be configured to provide feedback on an UL physical control channel referred to as HS-DPCCH2 transmitted on the secondary uplink carrier. In an another example, the WTRU 410 may be configured to provide feedback on an UL physical control channel referred to as HS-DPCCH2, which may be transmitted on the same UL carrier as the conventional HS-DPCCH using a different channelization code and possibly different in-phase/quadrature (I/Q) branch. The HS-DPCCH format and channelization code and I/Q branch mapping as defined for HSDPA operations is referred to as HS-DPCCH1.

The WTRU 410 may be configured to transmit the additional uplink control channel(s) (e.g., HS-DPCCH2) using additional channelization codes and possibly mapped to different I/Q branches. In one embodiment, HS-DPCCH1 and HS-DPCCH2 are transmitted in the same UL carrier. This ensures that multi-carrier operation is functional regardless on the number of UL carriers. The WTRU 410 may transmit the uplink control channels in a single transmission time interval (TTI), or over consecutive TTIs.

In another alternative, the WTRU 410 may be configured such that an additional UL scrambling code carries control channels, such as HS-DPCCH2.

The WTRU 410 transmits ACK/NACK and CQI feedback for the first two carriers on HS-DPCCH1. However, when one or more additional carriers are configured, the WTRU 410 transmits ACK/NACK and CQI feedback for the additional carriers on the additional uplink control channels (e.g., HS-DPCCH2).

Each additional uplink control channel (e.g., HS-DPCCH2) provides ACK/NACK and CQI feedback for one or two additional DL carriers. If more than two additional carriers are present, the WTRU 410 may use an additional channelization code or, optionally, another UL scrambling code for HS-DPCCH3 and for additional uplink control channels. According to this embodiment, the WTRU 410 may use x dual HS-DPCCH, where x is equivalent to the number of DL carriers divided by two (rounded up to the next largest integer).

Figure 6:
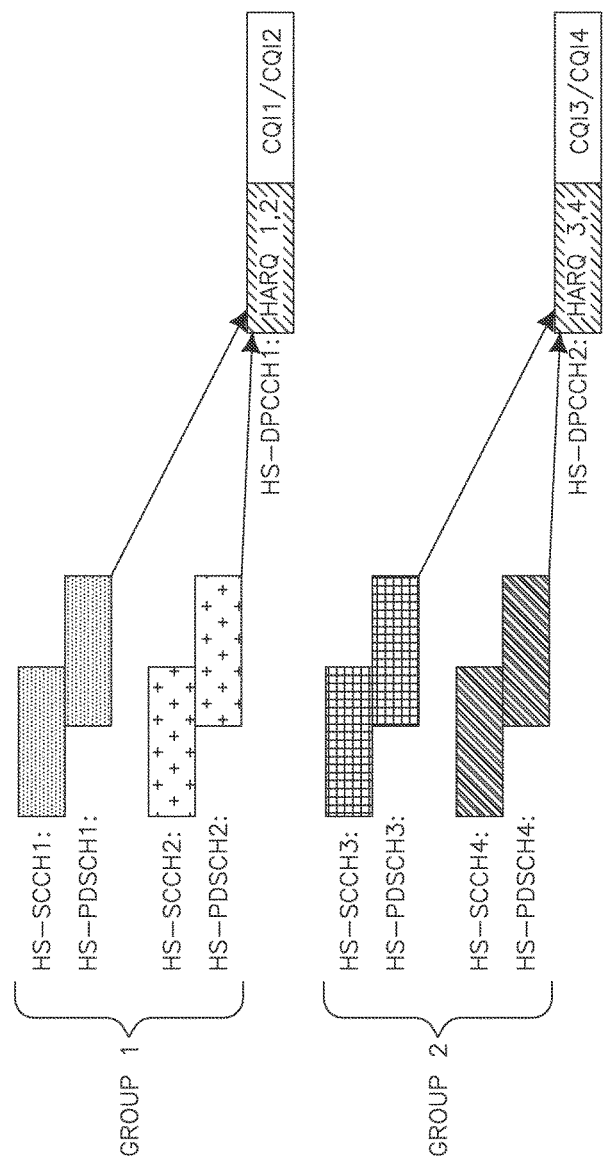
FIG. 6 shows an example format and channel coding using at least one new physical control channel to provide feedback information for additional carriers.

FIG. 6 shows a format and channel coding using at least one new physical control channel to provide feedback information for additional carriers.

The format and channel coding of HS-DPCCH2 (or HS-DPCCHx for n>4) may depend on the number of outstanding additional carriers in the system. More specifically, if there is one additional carrier (i.e., total of three carriers or an odd number of carriers when n>4), then the WTRU 410 reports a single ACK/NACK and CQI report on HS-DPCCH2 (or HS-DPCCHx). The HARQ acknowledgment message and the channel quality indication may be coded using the current single carrier channel coding for HS-DPCCH when MIMO is not configured. If two additional carriers are configured (or an even number of carriers when n>4), then the WTRU 410 uses the channel coding for HS-DPCCH when a secondary cell is present (i.e., the HS-DPCCH channel coding for current dual cell operation). Further, when n>4, HS-DPCCH(x−1) may be configured with a dual cell channel coding.

The channelization code and I/Q branch for the HS-DPCCH2 may be designed to minimize the cubic metric.

In an alternative embodiment, the WTRU 410 is configured to operate in more than one UL carrier. Accordingly HS-DPCCH1 and HS-DPCCH2 may be transmitted on different UL carriers. For example, HS-DPCCH1 may be transmitted on the anchor/primary UL carrier, and HS-DPCCH2 may be transmitted on the secondary carrier. In this example, the HS-DPCCH channelization code and I/Q branch may be the same for both HS-DPCCH formats, but transmitted on different frequencies.

It is possible that a WTRU 410 may communicate using multiple carriers and then switch to communicating via a single carrier. If a secondary UL carrier is disabled or deactivated and multi-carrier operation continues, the WTRU 410 may be configured to revert to providing feedback as it may in single carrier operation. Accordingly, the WTRU 410 may autonomously switch transmission of the HS-DPCCH2 on the anchor carrier. This switch may be performed, for example, using an additional channelization code, on a different scrambling code, or using another single carrier approach, for example, using a embodiments described herein. Similarly, when the secondary UL carrier is enabled and activated or re-activated, the WTRU 410 may resume transmission of the HS-DPCCH2 on an additional channelization code or, optionally, on a different scrambling code as defined on the anchor carrier. Optionally, multi-carrier operation may be configured and/or performed when the WTRU 410 is transmitting over two carriers in the UL, in which case each group of DL carriers may have an associated HS-DPCCH on the UL carrier paired with the DL carrier belonging to that group. For example, for n DL carriers, the WTRU 410 may require x UL carriers to transmit the x HS-DPCCH associated with each pair of DL carriers.

The pair of carriers associated with each HS-DPCCH may be defined or preconfigured by the network in any one or a combination of the following: the network may explicitly configure the mapping of carriers to a HS-DPCCH using Radio Resource Control (RRC) signaling, the network may have a predetermined mapping for the carriers to a HS-DPCCH based on the order of the DL frequencies provided in a configuration; carrier-1 and carrier-2 may always correspond to the primary/anchor DL carrier and the first adjacent frequency of the primary carrier while carrier-3 and carrier-4 may correspond to the remaining supplementary frequencies of the WTRU 410 and be defined in order of the provided frequencies or the provided configuration; carrier-1 and carrier-2 may correspond to the primary anchor carrier and the supplementary carrier while carrier-3 and carrier-4 may correspond to a secondary anchor carrier and the adjacent carrier associated to that frequency; carrier-1 and carrier-2 may correspond to two DL anchor/primary cells, (if two DL anchor carriers are present as defined above), while carrier-3 and carrier-4 correspond to the supplementary carriers thereby allowing the network to disable a secondary carrier associated with each primary carrier; carrier-1 and carrier-2 correspond to the anchor and secondary carrier associated to the UL carrier in which the HS-DPCCH1 is being transmitted while carrier-3 and carrier-4 correspond to the anchor and secondary frequency of the secondary UL carrier in which HS-DPCCH2 is being transmitted; the HS-DPCCH may be band dependent such that one HS-DPCCH is used per band when the carriers are over different bands, (e.g., if two carriers are on each band, then the WTRU 410 uses one HS-DPCCH per band and if three carriers are on one band, then the WTRU 410 uses three HS-DPCCHs), but, if two or less transmissions are detected, then the first HS-DPCCH may send the report regardless of which carriers are transmitting; or a HS-DPCCH may be used to carry information of the primary cells, (i.e., the cells associated with the UL carriers, if the UL carriers are transmitted), thereby allowing the network to disable the secondary carriers associated with each primary carrier. The examples described are for the case of four DL carriers, (mapping to two HS-DPCCHs), however, it should be understood that the concepts described may also apply in general to three or more carriers.

The WTRU 410 may further be configured for flexible carrier to uplink control channel (e.g., HS-DPCCH) mapping. In a multi-carrier system the WTRU 410 may be configured to transmit a HARQ and CQI for each carrier. For example, in a four carrier system, the WTRU 410 may transmit up to four HARQ feedbacks (i.e., HARQ1, HARQ2, HARQ3, HARQ4) and up to four CQI feedbacks (i.e., CQI1, CQI2, CQI3, CQI4). The WTRU 410 may be configured to dynamically adjust the amount and type of feedback based on the received DL transmissions. For example, the WTRU 410 may be configured to only transmit on certain uplink control channels in case a corresponding downlink transmission is received. When the WTRU 410 transmits on the additional UL physical control channels, (i.e., HSDP-CCH), the WTRU 410 is configured to determine an optimal or preferred channelization code. The optimized or preferred channelization code may be signaled by the network, or determined by the WTRU 410 based, for example, on minimizing a power ratio, power backoff, or maximizing power headroom. Using a fixed carrier to HS-DPCCH mapping, the feedback for carriers i and j is carried on HS-DPCCHx, where the mapping for carrier i, j and x is fixed. That is, for each HS-DPCCH corresponds up to two downlink carriers.

Table 3 shows possible combinations of HARQ and CQI feedback in a four carrier system. Because HARQ and CQI feedback are not dependent, for each HARQ feedback combination, one out of a possible sixteen CQI feedback combinations is used. A 'Y' in Table 3 indicates that the feedback is transmitted and a 'N" in the Table 3 indicates that the feedback is not transmitted.

TABLE 3

| Comb. | HARQ1 | HARQ2 | HARQ3 | HARQ4 | CQI1 | CQI2 | CQI3 | CQI4 |
|---|---|---|---|---|---|---|---|---|
| A | N | N | N | N | N | N | N | N |
|   | Y | N | N | N | Y | N | N | N |
|   | N | Y | N | N | N | Y | N | N |

TABLE 3-continued

| Comb. | HARQ1 | HARQ2 | HARQ3 | HARQ4 | CQI1 | CQI2 | CQI3 | CQI4 |
|---|---|---|---|---|---|---|---|---|
|  | N | N | Y | N | N | N | Y | N |
|  | N | N | N | Y | N | N | N | Y |
|  | Y | Y | N | N | Y | Y | N | N |
|  | Y | N | Y | N | Y | N | Y | N |
|  | Y | N | N | Y | Y | N | N | Y |
|  | N | Y | Y | N | N | Y | Y | N |
|  | N | Y | N | Y | N | Y | N | Y |
|  | N | N | Y | Y | N | N | Y | Y |
| B | Y | Y | Y | N | Y | Y | Y | N |
|  | Y | Y | N | Y | Y | Y | N | Y |
|  | Y | N | Y | Y | Y | N | Y | Y |
|  | N | Y | Y | Y | N | Y | Y | Y |
|  | Y | Y | Y | Y | Y | Y | Y | Y |

Table 3 shows two different feedback combinations, combinations A and combinations B. In the section labeled combinations A, the WTRU 410 sends CQI and HARQ feedback for a maximum of two carriers simultaneously. Accordingly, the WTRU 410 may send all feedback using a single feedback channel (e.g., HS-DPCCH) provided that the feedback channel has a flexible carrier/HS-DPCCH mapping. A flexible carrier/HS-DPCCH mapping HARQ feedback is provided for any two carriers (i, j) and CQI feedback is provided for any two carriers (m, n) where the carriers (i, j, m, n) need not be the same. The mapping associates carriers i, j (for HARQ), and m, n (for CQI) to an HS-DPCCH x.

In the section labeled Combinations B, the WTRU 410 sends HARQ or CQI feedback for three carriers simultaneously. The sending of HARQ or CQI feedback for three carriers requires that the WTRU 410 use two feedback channels (e.g., two HS-DPCCHs).

To provide the network with an indication of which carriers are sending feedback, the WTRU 410 may signal which one of the possible combinations is being included in the HS-DPCCH. For example, in the case where two carriers are active, it may be (11)(11)=121 possible combinations. The signaling of the indication may require at least seven bits. In one embodiment, the WTRU 410 uses a HS-DPCCH channelization code number, where the channelization code number is selected from a set that has been optimized for cubic metric performance, to signal the index of carriers sending feedback. In another embodiment, the index of carriers sending feedback is sent inband along with the CQI and HARQ feedback. This is performed by either expanding the codeword set of the HARQ feedback or reducing the coding of the CQI feedback.

Alternatively, the network may blind detect the carriers and channelization code and I/Q branches providing the CQI and HARQ feedback. For the CQI feedback, the network may make use of the configured CQI feedback cycle and repetition factor to determine the carrier associated to the received feedback. For the HARQ feedback, the network may use knowledge of transmitted downlink and the strict timing requirements for the HARQ feedback, to determine the carrier associated with the received feedback.

In an alternative embodiment, a single uplink control channel (e.g., HS-DPCCH) channelization code may be used to carry feedback information in a multi-carrier system. The channel coding for the HARQ and CQI feedback is described in greater detail hereafter.

With respect to the HARQ feedback, more particularly the channel coding for HARQ ACK/NACK, two different channel coding implementations may be defined for three or four carrier operation. Alternatively, one channel coding implementation is defined for four carrier operation and may also be used for three carrier operation. Because there may be three or four carriers, there may be four transmissions during one TTI and possibly up to eight transport blocks in the case where dual-stream MIMO operations is configured for each carrier. As a result, there are a large number of different possible feedback combinations, including PRE/POST signaling. In the case of four carriers, this may require many bit (e.g., 7, 8, or more) bits to transmit all the different possible feedback combinations.

Figure 7:
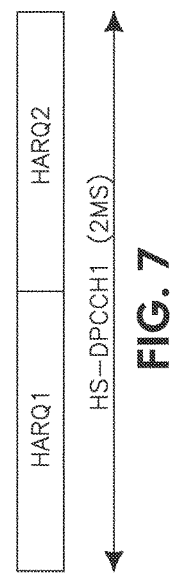
FIG. 7 shows an example HS-DPCCH frame format where two HARQ-ACK fields (HARQ1 and HARQ2) are time-multiplexed.

In one embodiment, the HARQ feedback may be transmitted using a new HS-DPCCH frame format that carries ACK/NACK feedback without carrying any CQI feedback. This embodiment allows the WTRU 410 to use a full sub-frame (i.e., the space used for CQI feedback to carry the ACK/NACK information bits for all three or four carriers. An example of the resulting frame format is illustrated in FIG. 7, where two HARQ-ACK fields (e.g., HARQ1 and HARQ2) are time-multiplexed in a single new HS-DPCCH frame format.

Alternatively, the CQI feedback is multiplexed in the same HS-DPCCH code as the HARQ feedback. To achieve this, the WTRU 410 may be configured to adjust a spreading factor (SF). For example, the WTRU 410 may lower the spreading factor making more symbols are made available on the HS-DPCCH, thereby essentially creating a new HS-DPCCH format. In one example of this embodiment, the WTRU 410 may be configured to generate an HS-DPCCH with a frame format using a spreading factor of 128 instead of the conventional spreading factor of 256. Using the same frame structure of three radio slots, this may allow for twice as many control information symbols to be available for transmission on this new SF-reduced HS-DPCCH (e.g., 60 symbols as opposed to 30 symbols). Accordingly, two conventional HARQ-ACK fields and two conventional CQI fields may be multiplexed into the new structure.

Figure 8:
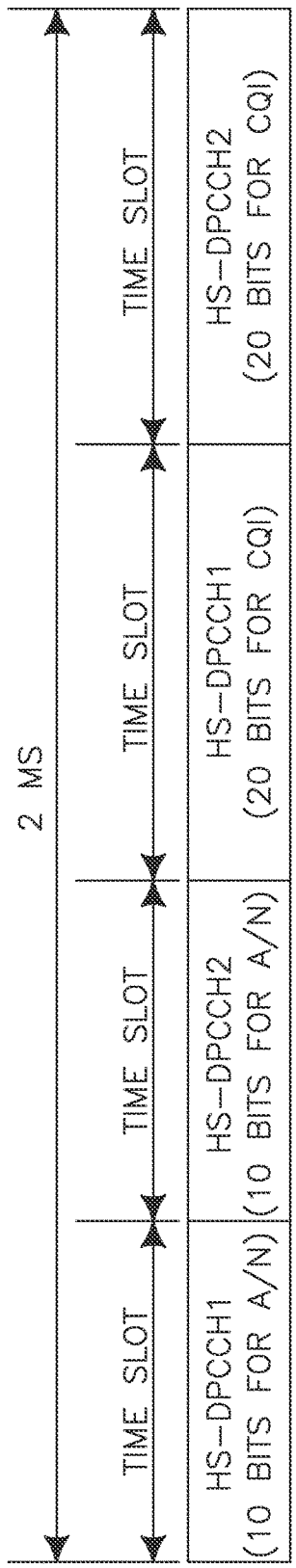
FIG. 8 shows an example time slotted structure of two consecutive sub-frames of a HS-DPCCH.

FIG. 8 shows an example time slotted structure of two consecutive sub-frames of a HS-DPCCH. As shown in FIG. 8, a 2 ms sub-frame is split into four time slots. It can be seen in this example that the HARQ-ACK field of the HS-DPCCH1 and HS-DPCCH2 may be multiplexed in the first time slot of the new HS-DPCCH whereas the CQI field of the HS-DPCCH1 and HS-DPCCH2 may be multiplexed in the second and third time slot of the new HS-DPCCH frame format. In one option, the conventional encoding of the HARQ-ACK and CQI fields may be used.

Figure 9:
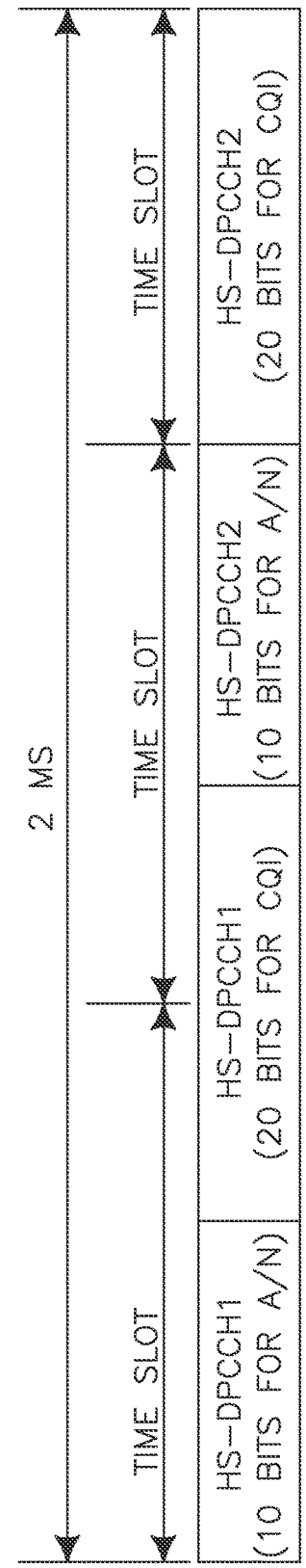
FIG. 9 illustrates another example of possible HS-DPCCH frame structure with the spreading factor of 128.

FIG. 9 illustrates another example of possible HS-DPCCH frame structure with a spreading factor of 128. In this example HS-DPCCH1 is multiplexed with HS-DPCCH2 sequentially.

Other time-multiplexing structures may also be considered without changing the basic concept described in this document.

With respect to the CQI feedback, because the WTRU 410 may be configured to receive from up to three or more DL carriers, the WTRU 410 may have to transmit CQI feedback for all of the configured DL carriers.

Figure 10:
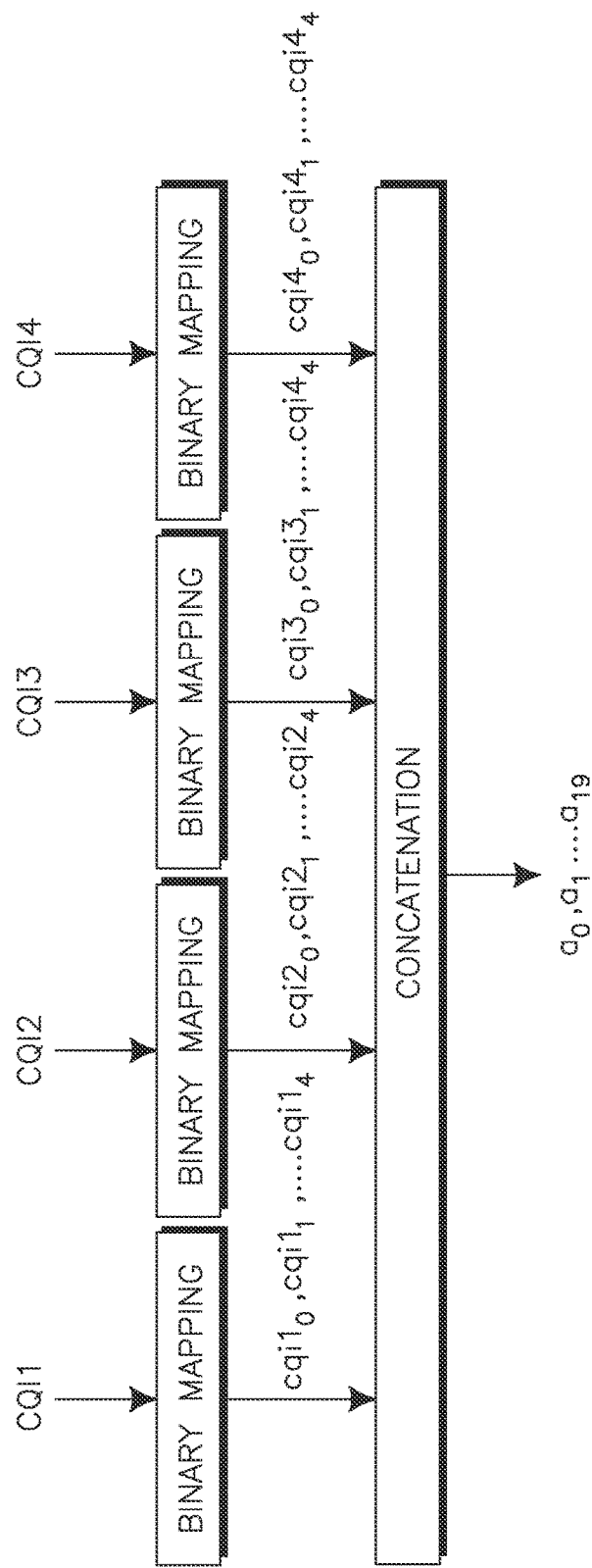
FIG. 10 shows an example embodiment where a composite CQI feedback report is made from four individual CQI reports that are represented by CQI1, CQI2, CQI3, and CQI4.

FIG. 10 shows a composite CQI feedback report made from four individual CQI reports that are represented by CQI1, CQI2, CQI3, and CQI4, when there are four configured DL carriers. Although each CQI feedback report in FIG. 10 is shown to carry five bits, any number of bits may be used in the CQI feedback report. Further, different numbers of bits may be used for each CQI feedback report.

Alternatively, the composite CQI feedback report made from four individual CQI reports may be transmitted in one HS-DPCCH with the HARQ feedback. However, this may require that additional information bits be sent over the HS-DPCCH. These additional information bits may require a change in the spreading factor or other similar signaling changes.

In one embodiment, the CQI feedback report is multiplexed with the HARQ feedback but not all of the CQI reports are concatenated and transmitted together. If the WTRU 410 is unable to send three or four CQI reports in one TTI, then the WTRU 410 may use time multiplexing of different CQI reports. Alternatively, as discussed herein, the WTRU 410 may be configured to reduce the spreading factor further. In some cases, the WTRU 410 may need to adjust the power of transmission to account for the lower spreading factor.

For example, the WTRU 410 may send CQI reports for one carrier at a time in different sub-frames. More particularly, a sub-frame number may be reserved for a certain CQI report such that the WTRU 410 may send CQI1 in the first sub-frame of a frame, CQI2 on the second sub-frame, and so on.

In an alternative embodiment, two CQI reports may be concatenated into a composite CQI report to be sent over the HS-DPCCH in a TTI. The WTRU 410 may alternate, in time, the sending of a pair of CQI reports. For example, the WTRU 410 may send the concatenated CQI1 and CQI2 in odd sub-frames and CQI3 and CQI4 in even sub-frames. In case CQI repetition is configured (i.e., N_cqi_transmit>1), the WTRU 410 may transmit all repetition of the concatenated CQI1 and CQI2 first and then all repetitions of the concatenated CQI3 and CQI4 next. Alternatively, the WTRU 410 may transmit the concatenated CQI1 and CQI2 in time alternation with concatenated CQI3 and CQI4 until all repetitions are transmitted. This embodiment may be extended to various grouping and time multiplexing configurations.

The WTRU 410 may further be configured to reduce CQI feedback using multiplexing. In one embodiment, the transmission of HARQ feedback by the WTRU 410 for multiple carriers is combined with a reduction of the reporting frequency of CQI feedback for each carrier. This may prevent excessive peak UL power requirements due to feedback when multiple DL carriers are configured.

The reduction of CQI feedback overhead may be leveraged in several possible ways. For example, the reduction of CQI overhead may allow for the time-multiplexing of feedback information over two consecutive sub-frames when a single UL carrier is used.

Figure 11:
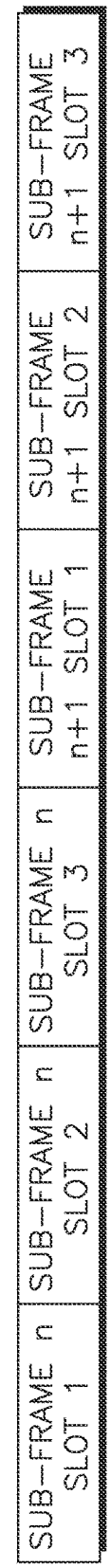
FIG. 11 shows a time slot structure of two consecutive sub-frames of a HS-DPCCH.

FIG. 11 shows the time slot structure of two consecutive sub-frames of a HS-DPCCH. In one embodiment, the HARQ feedback information or the CQI feedback information or both types of feedback may be jointly encoded over two consecutive sub-frames. Table 4 shows HARQ feedback that is jointly encoded and is related to a set of two past consecutive sub-frames.

TABLE 4

| | Option 1 | Option 2 | Option 3 |
|---|---|---|---|
| Sub-frame n Slot 1 | ACK/NAK carriers 1&2 Sub-frame n-x | ACK/NAK carriers 1&2 Sub-frame n-x | ACK/NAK carriers 1&2 Sub-frame n-x |
| Sub-frame n Slot 2 | ACK/NAK carriers 3&4 Sub-frame n-x | ACK/NAK carriers 3&4 Sub-frame n-x | ACK/NAK carriers 3&4 Sub-frame n-x |
| Sub-frame n Slot 3 | CQI part 1 carrier (n div 2) mod 4 + 1 | CQI part 1 carriers 2[(n mod 4) div 2] + 1 & 2[(n mod 4) div 2] + 2 | ACK/NAK carriers 1&2 Sub-frame n-x + 1 |
| Sub-frame n + 1 Slot 1 | ACK/NAK carriers 1&2 Sub-frame n-x + 1 | ACK/NAK carriers 1&2 Sub-frame n-x + 1 | ACK/NAK carriers 3&4 Sub-frame n-x + 1 |
| Sub-frame n + 1 Slot 2 | ACK/NAK carriers 3&4 Sub-frame n-x + 1 | ACK/NAK carriers 3&4 Sub-frame n-x + 1 | CQI part 1 carriers 2[(n mod 4) div 2] + 1 & 2[(n mod 4) div 2] + 2 |
| Sub-frame n + 1 Slot 3 | CQI part 2 carrier (n div 2) mod 4 + 1 | CQI part 2 carriers 2[(n mod 4) div 2] + 1 & 2[(n mod 4) div 2] + 2 | CQI part 2 carriers 2[(n mod 4) div 2] + 1 & 2[(n mod 4) div 2] + 2 |
| CQI encoding | As in single carrier case | As in dual-carrier case | As in dual-carrier case |

As shown in Table 4, there are different options for joint encoding feedback over consecutive sub-frames. In Option 1 and Option 2, the two first slots of each sub-frame are utilized to provide HARQ feedback for up to four downlink carriers. The encoding of HARQ feedback information in each slot may be the same encoding used for the dual-carrier case. When there are only three carriers, it is possible to encode one of the slots for a single carrier. The third slot of each sub-frame may be used to encode CQI information. Because CQI information normally requires two slots, half of the bits are transmitted in the first sub-frame and the other half in the second sub-frame.

Depending on whether the CQI for one carrier (Option 1) or two carriers (Option 2) is transmitted in each pair of sub-frames, the CQI encoding is performed based on the single-carrier or dual-carrier mechanism, respectively. If it is not possible to report the CQI for all four carriers over a pair of sub-frames, then the WTRU 410 may be configured to report the CQI for each carrier once every four pairs of sub-frames (Option 1) or once every two pairs of sub-frames (Option 2). In case there are only three carriers, a similar method may be used except the WTRU 410 may be configured to report each carriers CQI every three pairs of sub-frames (Option 1) or in every two out of three pairs of sub-frames (Option 2). Option 3 is similar to Option 2, except that the information is spread differently over the six slots.

Second, the reduction of CQI overhead may allow for the multiplexing of feedback information over two carriers when a dual UL carrier is used.

When multiple UL carriers are available, the WTRU 410 may be configured to transmit feedback over each of the UL carriers. However, when the UL transmission power is limited, it remains important to reduce the maximum amount of power that needs to be transmitted in total on all of the carriers during a time slot. Table 6 shows options for reducing the peak power requirement of High-Speed Physical Downlink Shared Channel (HS-PDSCH) feedback where two uplink carriers are available and up to four carriers are used in the downlink.

Code Power (RSCP), or a calculated CQI. The delta and quality metric may be preconfigured by the network, signaled through system information, or provided with the HS-DSCH configuration information. Alternatively, these parameters may be constant across all carriers or specific to each carrier.

TABLE 5

|  | Option 1 | Option 2 | Option 3 | Option 4 |
|---|---|---|---|---|
| sub-frame n UL carrier-1 Slot 1 | ACK/NAK carriers 1&2 sub-frame n-x | ACK/NAK carrier-1 sub-frame n-x | ACK/NAK carriers 1&2 sub-frame n-x | ACK/NAK carrier-1 sub-frame n-x |
| sub-frame n UL carrier-1 Slot 2 | ACK/NAK carriers 3&4 Sub-frame n-x | ACK/NAK carrier-2 sub-frame n-x | ACK/NAK carriers 3&4 Sub-frame n-x | ACK/NAK carrier-2 sub-frame n-x |
| sub-frame n UL carrier-2 Slot 3 | CQI part 1 carrier n mod 4 + 1 | CQI part 1 carrier n mod 4 + 1 | CQI part 1 carriers 2[(n mod 2)] + 1 & 2[(n mod 2)] + 2 | CQI part 1 carriers 2[(n mod 2)] + 1 & 2[(n mod 2)] + 2 |
| sub-frame n UL carrier-2 Slot 1 | No transmission | ACK/NAK carrier-3 sub-frame n-x | No transmission | ACK/NAK carrier-3 sub-frame n-x |
| sub-frame n UL carrier-2 Slot 2 | No transmission | ACK/NAK carrier-4 sub-frame n-x | No transmission | ACK/NAK carrier-4 sub-frame n-x |
| sub-frame n UL carrier-2 slot 3 | CQI part 2 carrier n mod 4 + 1 | CQI part 2 carrier n mod 4 + 1 | CQT part 1 carriers 2[(n mod 2)] + 1 & 2[(n mod 2)] + 2 | CQI part 1 carriers 2[(n mod 2)] + 1 & 2[(n mod 2)] + 2 |
| CQI encoding | As in single carrier case | As in single carrier case | As in dual-carrier case | As in dual-carrier case |
| ACK/NAK encoding | As in dual-carrier case | As in single carrier case | As in dual-carrier case | As in single carrier case |

In all four options shown in Table 5, the third slot of the sub-frame is available to CQI reporting on each uplink carrier. In Option 1 and Option 2, the CQI for one downlink carrier may be reported in each sub-frame. The CQI is encoded in the same way as the single (DL) carrier case, except that the two slots are on two different UL carriers. In Option 3 and Option 4, the CQI for two downlink carriers may be reported in each sub-frame. The CQI is encoded in the same way as the dual-carrier case, except that the two slots are on two different UL carriers. In Option 1 and Option 3 the HARQ feedback is reported for two downlink carriers in each slot, but on one UL carrier using the same encoding as has been defined for the dual-DL carrier case. In Option 2 and Option 4, the HARQ feedback is also reported for two downlink carriers in each slot, but on both UL carriers using the normal HARQ feedback encoding used for the single-DL carrier case.

The WTRU 410 may further be configured to reduce CQI feedback using autonomous transmission. When a WTRU 410 is configured with more than N DL carriers (e.g., N>2), the network may configure the WTRU 410 to autonomously determine when to transmit the CQI for each of these carriers. Because the value of a CQI for a WTRU 410 may be relatively constant over a short period of time, the network may receive little or no additional information from the repeated CQI values. Accordingly, the WTRU 410 may be configured to determine a feedback cycle and repetition factor. Alternatively, the network may signal the feedback cycle and repetition factor.

The WTRU 410 may monitor the quality of all carriers and transmit a fresh CQI if the quality of one of the carriers changes by more than a predetermined threshold value or predetermined delta. The quality may be based on a measured Common Pilot Channel (CPICH) Energy per Chip/power density in the band (EcNo), CPICH Received Signal If the WTRU 410 determines that during a sub-frame more than one carrier requires a CQI update, the WTRU 410 may decide to perform any one or a combination of the following. The WTRU 410 may transmit the CQI for the carrier experiencing the biggest change in quality (e.g., CPICH EcNo, CPICH RSCP, or the calculated CQI). The WTRU 410 may transmit the CQI for the carrier which may suffer the most from using an outdated CQI (e.g., in a case where carrier-1 supports a larger transport block than was reported in its last CQI transmission while carrier-2 supports a smaller transport block than was reported in its last CQI transmission, the WTRU 410 may decide to send CQI for carrier-2, even if the quality measure for this carrier changed less than for carrier-1 and transmissions on carrier-1 may still continue but at a rate lower than what is supported by the WTRU 410). The WTRU 410 may base its decision on the type of traffic it is receiving (e.g., if the WTRU 410 is receiving DL traffic, then the WTRU 410 may prioritize Dedicated Control Channel (DCCH) over Dedicated Traffic Channel (DTCH)). Or the WTRU 410 may transmit more than one CQI in a single HS-DPCCH.

As the CQI transmissions are autonomous, the network no longer knows the link between the reported CQI and the carrier associated with the reported CQI. To establish the link between the reported CQI and carrier, the WTRU 410 may include the carrier index information within the uplink control channel feedback (e.g., HS-DPCCH). For example, the WTRU 410 may transmit a two-bit carrier index along with the reported CQI. The reported CQI may be reduced to accommodate the additional information. Alternatively, the coding on the CQI may be reduced to accommodate the additional information. Further, in sub-frames where no HARQ feedback is required, the WTRU 410 may use the HARQ-ACK field to indicate the carrier index, for example by using one of four reserved codewords, each one associated to a specific carrier index.

In this embodiment, the WTRU 410 may be configured to repeat the CQI. If the WTRU 410 is required to transmit a new CQI (for a different carrier) at the same time that it may be required to transmit a repeat of an old CQI, the WTRU 410 may define and apply rules to prioritize one transmission over the other. For example, according to one rule the WTRU 410 may be configured to prioritize the new CQI such that it is transmitted over other CQI (absolute priority of new CQIs). In another rule, the WTRU 410 may be configured to transmit the new CQI only if a predetermined minimum time interval between the first instance of the repeated CQI and transmission of the new CQI, (possibly from a different carrier), has elapsed. As the CQI are transmitted autonomously by the WTRU 410, the interval between repeated transmissions may be left to the WTRU 410, with each transmission requiring an indication of the carrier. Alternatively, the transmission interval may be preconfigured, provided in system information, or transmitted with HS-DSCH information.

The WTRU 410 may further be configured to reduce CQI feedback through multiplexing and autonomous transmission. In this embodiment, the WTRU 410 may be configured to use the time multiplexing of the feedback over two consecutive sub-frames. The embodiments described hereafter are done so in reference to Option 1 as an example, however, embodiments may be generalized to cover Option 2 and Option 3 as well. The WTRU 410 may send the HARQ feedback for the four carriers in the first two slots of every sub-frame, and send the CQI feedback spread over every two consecutive sub-frames, (e.g., in the third slot of each of these sub-frames). The CQI transmitted over these two sub-frames may be the CQI for a single carrier, which the WTRU 410 has determines autonomously. The carrier indication is provided to the network through the use of reserved codewords for the four slots carrying the HARQ feedback. Each of the slots carries HARQ feedback for two DL carriers. A special or unique set of codewords may be used in slot K (K=1, 2, 3, 4) if the WTRU 410 is transmitting CQI for carrier K. The network blindly detects the usage of the special set of codewords in one of the slot and uses the slot index to determine the carrier for which the CQI belongs.

In an alternate embodiment, multiple uplink control channel codes are used to transmit feedback separately (e.g., two HS-DPCCH codes for HARQ feedback and CQI feedback). Two HS-DPCCH formats are defined to carry CQI feedback and HARQ feedback over two HS-DPCCHs. For example, one HS-DPCCH transmits the HARQ-ACK field for all four carrier or three carriers using the full sub-frame to carry the information. The HARQ feedback may be jointly coded or separately coded.

Alternatively, separate jointly coded HARQ feedback may be sent on HS-DPCCH1. For example, HARQ1 field contains the HARQ feedback for carrier-1 and carrier-2, which are jointly coded. HARQ2 field contains the HARQ feedback for carrier-3 and carrier4 which are jointly coded. In the case of three carriers, the HARQ1 may be jointly coded for carrier-1 and carrier-2 and HARQ2 may separately contain the HARQ feedback of carrier-3. For the case where the number of carriers N>4, the WTRU 410 may contain x HARQ fields which are jointly coded in pairs, where x is equal to the integer number of N/2 rounded up.

Figure 12:
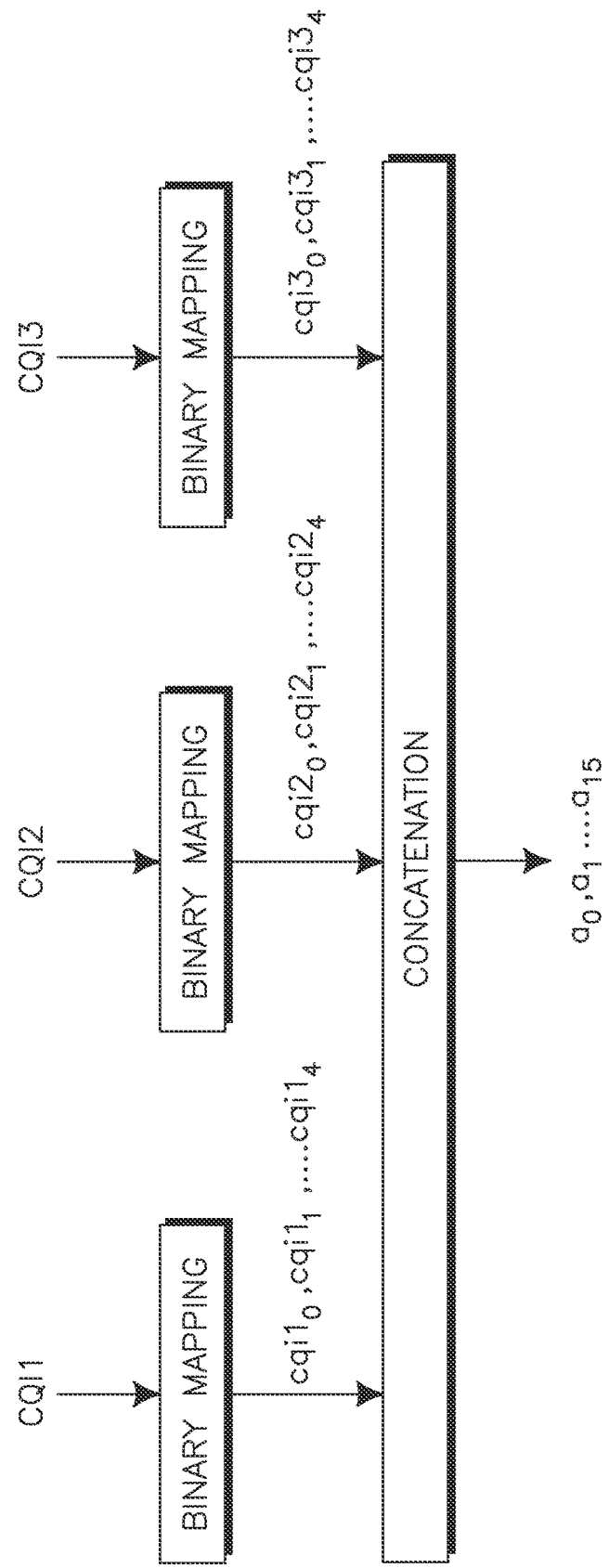
FIG. 12 shows an example embodiment of a composite CQI report with three reports, where three CQI reports are concatenated together.

FIG. 12 shows an example embodiment where three CQI reports are concatenated together. The second HS-DPCCH code is used to send the CQI reports of up to four carriers in one full sub-frame. The CQI composite is constructed by concatenating CQI1, CQI2, CQI3, and CQI4 together.

The channelization code and I/Q branch for the second HS-DPCCH may be designed to minimize the cubic metric. The first HS-DPCCH channelization code and branch may be one in use for HS-DPCCH.

The HS-DPCCH1 and HS-DPCCH2 may be transmitted in the same UL carrier. This may ensure that multi-carrier operation may be functional regardless of the number of UL carriers. Alternatively, the HS-DPCCH1 and HS-DPCCH2 may be transmitted in different UL carriers, if the WTRU 410 is configured to operate in more than one UL carrier.

Figure 13:
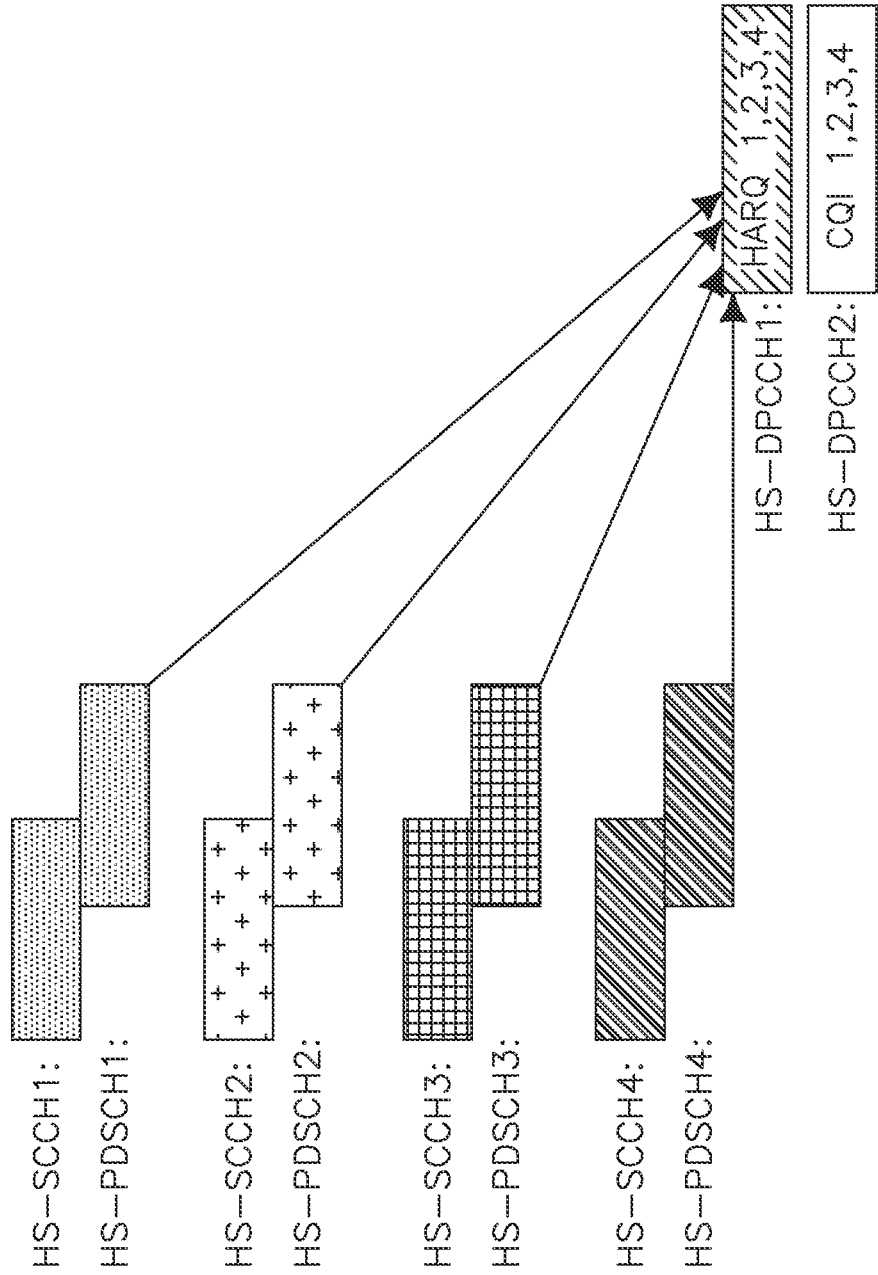
FIG. 13 shows an example embodiment where the HS-DPCCH1 may be transmitted on the serving/primary UL carrier and HS-DPCCH2 may be transmitted on the secondary carrier.

FIG. 13 shows an example embodiment where the HS-DPCCH1 is transmitted on the serving/primary UL carrier and HS-DPCCH2 is transmitted on the secondary carrier. In this case the HS-DPCCH channelization code and I/Q branch may be the same for both HS-DPCCH formats, but transmitted on different frequencies. In the case where the secondary UL carrier is disabled and multi-carrier DL operation continues, the WTRU 410 may start transmitting HS-DPCCH2 on an additional channelization code defined on the anchor carrier. When the WTRU 410 activates (or re-activates) the secondary uplink carrier, it may transmit HS-DPCCH2 on the secondary uplink carrier as described herein. The WTRU 410 transmits the additional HS-DPCCH or set of control channels using the conventional channelization code and I/Q branch but using a specific and different scrambling code.

In an alternate embodiment, the WTRU 410 may use a second UL scrambling code for sending feedback information for the different downlink carriers. The network configures the WTRU 410 with a different scrambling code for each additional physical uplink control channel (e.g., HS-DPCCH) or set of control channels needed.

The format of the control information sent using the second scrambling code, may be similar to that defined for dual-cell operation that allows transmission of two cell HARQ feedback and two cell CQI reporting. Alternatively, the format may be according to any of the embodiments described herein.

The feedback channel may be configured by the network or implicit based on the DL configuration.

When the WTRU 410 is configured with three or four downlink carriers without MIMO and has one UL carrier a control channel for dual-carrier operations (e.g., the HS-DPCCH for DC-HSDPA) may provide feedback for two of the three or four carriers. An additional control channel (e.g., an additional HS-DPCCH) may (using another channelization code, branch pair and/or using another scrambling code) report for the remaining carriers. In case three DL carriers are configured, a legacy control channel (e.g., the legacy HS-DPCCH) may be used to report the feedback for the remaining channel. In case four DL carriers are configured, a control channel for dual-carrier operations (e.g., the HS-DPCCH for DC-HSDPA) may be used to provide feedback for the remaining two carriers. The mapping between UL carrier and DL carrier may be implicit or signaled by the network. Each control channel (e.g., HS-DPCCH) may be configured with a different transmit power offset.

When the WTRU 410 is configured with three or four downlink carriers without MIMO and has two UL carriers, the HS-DPCCH for DC-HSDPA on the UL anchor carrier provides feedback for two of the three or four carriers. An additional control channel (e.g., an additional HS-DPCCH) is used on the UL secondary carrier to report for the remaining carriers. In case three DL carriers are configured, a legacy control channel (e.g., HS-DPCCH) may be used to report the feedback for the remaining channel. For example, in case four DL carriers are configured, a control channel used for dual-carrier communication (e.g., HS-DPCCH for DC-HSDPA) may be used to provide feedback for the remaining two carriers. The mapping between UL carriers and DL carriers may be implicit or signaled by the network. Each control channel (e.g., HS-DPCCH) may be configured with a different transmit power offset.

When the WTRU 410 is configured with two downlink carriers with MIMO and two UL carriers a high-speed control channel (e.g., HS-DPCCH for MIMO operations) on the UL anchor carrier may provide feedback for the downlink anchor carrier. A high-speed control channel for the secondary UL carrier (e.g., HS-DPCCH for MIMO operations on the UL secondary carrier) may be used for providing feedback for the downlink secondary carrier. Each HS-DPCCH may be configured with a different transmit power offset.

In another embodiment, methods of optimizing the HARQ acknowledgement codebook for feedback control in the context of simultaneous multiple carrier high-speed downlink operations are disclosed as follows.

For each HARQ transmission pertaining to a HS-DSCH per transmission time interval (TTI), the WTRU 410 receiver may exhibit the following states. If the receiver (or equivalently the WTRU 410) correctly receives both the HS-SCCH and the data packet associated with the HS-PDSCH, it may send an ACK. If the receiver correctly receives the control information from the HS-SCCH, but detects an error in the data packet, it may send a NACK. If the receiver fails to detect an HS-SCCH at present TTI that matches the identity (ID) assigned for a current WTRU 410, it may declare a DTX. For a DTX state, the following scenarios may occur: the Node-B 420 did not send any data at current TTI to this WTRU 410, or the WTRU 410 receiver fails to decode the HS-SCCH that is indeed addressed to this WTRU 410.

As for LTE, similarly to High-speed Packet Access (HSPA), for each HARQ transmission pertaining to a Physical Downlink Shared Channel (PDSCH) per transmission time interval (TTI), the WTRU 410 receiver 417 may exhibit the following states. If the receiver (or equivalently the WTRU 410) correctly receives both the Physical Downlink Control Channel (PDCCH) and the data packet associated with the PDCCH, it may generate an ACK. If the receiver 417 correctly receives the control information from the PDCCH, but detects an error in the data packet, it may generate a NACK. If no PDCCH control signaling intended for the WTRU 410 is detected at a present TTI, then the associated control information is not transmitted on the Physical Uplink Control Channel (PUCCH) (i.e., DTX). By not occupying PUCCH resources when no valid PDSCH-related control signaling is detected, the eNode-B 420 is able to conduct three-state detection: ACK, NACK, or DTX. In case the WTRU 410 has a valid uplink scheduling grant in the current TTI, the HARQ acknowledgements are time-multiplexed with data and transmitted on the Physical Uplink Shared Channel (PUSCH) rather than the PUCCH.

When multi-carrier downlink operation is configured, the composite acknowledgement message is represented by the HARQ-ACK states formed by a letter of either A, N, or D separated by a divider '/' to indicate the HARQ status of that carrier, where 'A' means 'ACK', 'N' means 'NACK' and 'D' means 'no transmission' (i.e., DTX). If MIMO is configured, then there may be two letters between the dividers for the dual-stream transmission incurring in that carrier. For example, A/NA/D carries the HARQ acknowledgement message for three carriers with the second carrier being configured with MIMO. It should be noted that the carriers may be treated equally and identified by their position in the message. For example, they are not distinguished by any means of the "primary", or "secondary", or "supplementary" carriers.

Because of transmissions over multiple carriers (e.g., three or four carriers) at the same TTI, in addition to potentially dual stream operation at each carrier that may result from the MIMO configuration, the number of total data streams may increase. The number of total data streams may lead to a large set of feedback combinations in a HARQ-ACK states codebook. For example, in networks using three or more carriers, the number of states may increase to eight (e.g., for HSPA) or more (e.g., in LTE/LTE-Advanced), which may lead to a large set of different feedback combinations of the HARQ-ACK states in the codebook. Carrier aggregation, where two or more component carriers are aggregated, may be implemented LTE-Advanced to support wider transmission bandwidths, (e.g., up to 100 MHz.). LTE-Advanced may support for more than five downlink component carriers. Accordingly, multiple ACK/NACKs corresponding to the downlink component carrier transport blocks may be transmitted in the uplink. For example, assuming a MIMO spatial multiplexing configuration with two transport blocks per component carrier, the total number of ACK/NACKs to be transmitted in the uplink may be ten.

Figure 14:
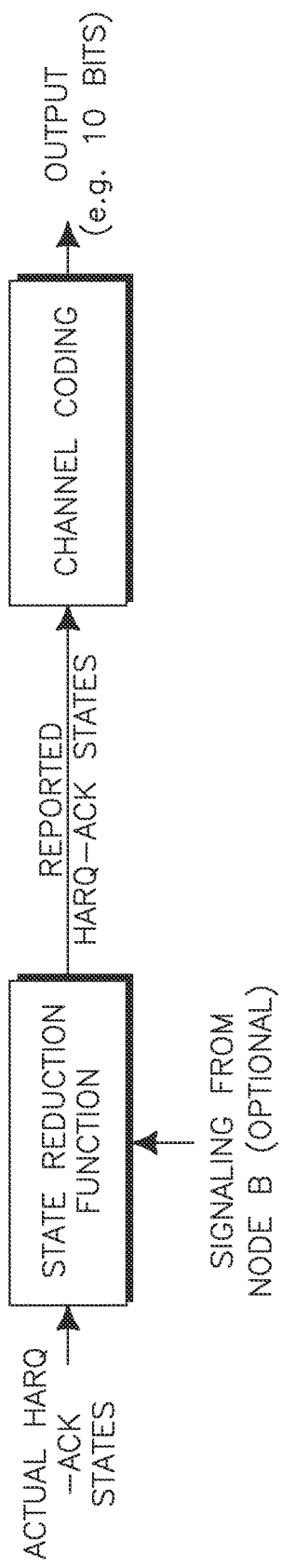
FIG. 14 shows an example of a state reduction function.

To reduce the size of the HARQ-ACK codebook table while minimizing the impact on the downlink transmission performance, the WTRU 410 may be configured with a state reduction device. FIG. 14 shows a state reduction function that may be implemented in the WTRU 410. The state reduction function may map actual HARQ-ACK states to reported HARQ-ACK states of a smaller set. As result of the state reduction function, the number of codewords in the channel coding is smaller, which may allow for better coding efficiency. The state reduction function may be preconfigured, signaled by the network, or dynamically determined based on conditions by the WTRU 410.

The state reduction function may be implemented according to one or any of combinations of the following embodiments.

In one embodiment, the WTRU 410 may be configured to perform a grouped DTX report method. The WTRU 410 groups a set of carriers or data streams. If the WTRU 410 detects DTX from any of the carriers or data streams, DTX is declared on all the other carriers or data streams regardless the HARQ-ACK states over other carriers or data streams in the group. Optionally, if the WTRU 410 detects a specified number of DTX states from any of the carriers, or data streams, the WTRU 410 declares DTX on all the other carriers or data streams regardless the HARQ-ACK states over other carriers or data streams in the group. This embodiment may be referred to as a grouped DTX report method.

In another embodiment, the WTRU 410 may be configured to perform a network signaling method. The WTRU 410 may be configured to perform state reduction conditional on signaling received from the network. The WTRU 410 may map HARQ acknowledgment states to other states differently depending on the signaling received from network, for example, on a per-TTI basis. Examples of such signaling may be indication of number of transport blocks being transmitted at a current TTI or for a group of TTIs.

In another embodiment, the Node-B 420 may be configured to perform a restricted transmission method. A set of carriers may be grouped and "no data transmission" at the Node-B 420 transmitter 427 is allowed simultaneously on all carriers within the set on a per-TTI basis, or group of TTIs. Within a set, rules are set to restrict the transmission state combinations across the carriers in the set. In particular, combinations of all transmission, or all no-transmission are allowed. The combinations of no-transmission only on partial carriers are not allowed. For example, in the case of four carriers, (e.g., C1, C2, C3, C4), the carriers may be grouped into sets wherein Set 1 includes C1/C2, and Set 2 includes C3/C4. The Node-B 420 may be configured with rules for each set, such that carriers C1 and C2 may be each set for transmission or each set for no-transmission. Accordingly, the signaling may be reduced because if carrier C1 is set for transmission it implies that carrier C2 is set for transmission, and vice versa. It should be understood that while the example is for four carriers and two groups, any number of carriers with any number of members in each group may be used. One alternative is that even if there is no data to transmit in one carrier, HS-SCCH is still sent if other carriers in the set are transmitting. Accordingly, the number of the possible HARQ-ACK states to transmit may be effectively reduced. This method may be referred to as a restricted transmission from a Node-B 420 method.

In another embodiment, the WTRU 410 may also be configured to provide a grouped NACK report. A set of carriers or data streams, is grouped, and if a NACK is detected (or a specified number of NACKs are detected) from any of the carriers, or data streams, then a NACK is declared on all the other carriers or data streams, regardless the HARQ-ACK states over other carriers or data streams in the group. Alternatively, if a NACK is detected from any of the carriers, or data streams, a NACK is declared on all the other carriers or data streams that have ACK state detected.

In another embodiment, the WTRU 410 may be configured to provide a conditional DTX report converted from a NACK. Depending on the states of the other carriers, if a NACK is detected on a carrier or data stream, then it is converted to DTX for reporting. The conditions for the conversion may be one or in any combination of the following if the number of DTX states among all the carriers or data streams, is greater than a specified value; if the number of NACK states among all the carriers or data streams, is greater than a specified value; and/or if the number of ACK states among all the carriers or data streams, is smaller than a specified or configured value. Setting the conditions identifies states that have a small probability of occurrence to minimize the impact on downlink performance due to reduction of the states.

In another embodiment, the WTRU 410 may be configured to provide a conditional NACK report converted from ACK. Depending on the states of the other carriers, if an ACK is detected on a carrier or data stream, it is converted to a NACK for reporting. The conditions for the conversion may be one or in any combination of the following: if the number of DTX states among all the carriers or data streams, is greater than a specified value; if the number of NACK states among all the carriers or data streams, is greater than a specified value; and/or if the number of ACK states among all the carriers, or streams, is smaller than a specified value.

It should be noted that the methodologies are generally applicable to any number of carriers with any form of MIMO combinations, which may create a vast number of unlisted designs of optimized codebooks for the HARQ acknowledgement.

Table 6 shows the possible combinations of the HARQ-ACK states for four carriers without MIMO configured. Simultaneous transmission over four carriers may result in a total number of HARQ-ACK states in the codebook equal to $3^4-1=80$, as listed in Table 6.

TABLE 6

| | | | | | |
|---|---|---|---|---|---|
| D/D/D/A | D/A/N/D | A/D/D/N | A/A/N/A | N/D/A/D | N/A/N/N |
| D/D/D/N | D/A/N/A | A/D/A/D | A/A/N/N | N/D/A/A | N/N/D/D |
| D/D/A/D | D/A/N/N | A/D/A/A | A/N/D/D | N/D/A/N | N/N/D/A |
| D/D/A/A | D/N/D/D | A/D/A/N | A/N/D/A | N/D/N/D | N/N/D/N |
| D/D/A/N | D/N/D/A | A/D/N/D | A/N/D/N | N/D/N/A | N/N/A/D |
| D/D/N/D | D/N/D/N | A/D/N/A | A/N/A/D | N/D/N/N | N/N/A/A |
| D/D/N/A | D/N/A/D | A/D/N/N | A/N/A/A | N/A/D/D | N/N/A/N |
| D/D/N/N | D/N/A/A | A/A/D/D | A/N/A/N | N/A/D/A | N/N/N/D |
| D/A/D/D | D/N/A/N | A/A/D/A | A/N/N/D | N/A/D/N | N/N/N/A |
| D/A/D/A | D/N/N/D | A/A/D/N | A/N/N/A | N/A/A/D | N/N/N/N |
| D/A/D/N | D/N/N/A | A/A/A/D | A/N/N/N | N/A/A/A | |
| D/A/A/D | D/N/N/N | A/A/A/A | N/D/D/D | N/A/A/N | |
| D/A/A/N | A/D/D/D | A/A/A/N | N/D/D/A | N/A/N/D | |
| D/A/A/N | A/D/D/A | A/A/N/D | N/D/D/N | N/A/N/A | |

The following example applies grouped DTX and report state reduction conditional on signaling received from the network method jointly in the effort of optimizing the codebook for four carriers. The four carriers, denoted by C1, C2, C3, C4, are grouped into two pairs: (C1/C2) and (C3/C4). There is no preference to the order of the carriers. It may be any other combination as long as the sets are formed pairwise. Secondly, it may be assumed that a network may be configured to transmit one or more bits to a WTRU 410 for each pair of the carriers, indicating whether the data transmission is performed on both of the carriers or on a single carrier in a pair. The reduction mapping is conducted on each pair of the carriers as follows. If there is any DTX in a pair and network signaling indicates a dual-carrier transmission over the pair, then report DTX on both of the carriers. For example, (D/A)/(A/N) may become (D/D)/(A/N), which may be simplified as (D)/(A/N). If there is any DTX in a pair and network signaling indicates a single carrier transmission over the pair, repeat the true state from the other carrier. For example, (D/A)/(A/N) may become (A/A)/(A/N). Both sides may know the single carrier transmission. Otherwise, the states remain unmodified.

Because one HS-SCCH may be shared by the dual data streams in the MIMO mode, a MIMO configured WTRU 410 may imply the use of a similar reduction mechanism on its HARQ-ACK codebook design. Therefore, it may be deduced that the downlink performance loss introduced by the above approach may be within the range similar to a MIMO configured systems.

Table 7 shows a conditional mapping for a single pair, where Dual TX means the condition that the network signaling indicates dual-carrier transmission, and Single TX means the condition that the data transmission is performed on one carrier in the pair.

TABLE 7

| | Reported states | |
|---|---|---|
| Original states | Dual TX | Single TX |
| (D/D) | (D/D) | (D/D) |
| (D/A) | (D/D) | (A/A) |
| (D/N) | (D/D) | (N/N) |
| (A/D) | (D/D) | (A/A) |
| (A/A) | (A/A) | (A/A) |
| (A/N) | (A/N) | (A/N) |
| (N/D) | (D/D) | (N/N) |

TABLE 7-continued

| Original states | Reported states | |
| --- | --- | --- |
| | Dual TX | Single TX |
| (N/A) | (N/A) | (N/A) |
| (N/N) | (N/N) | (N/N) |

A composite reported HARQ-ACK state for all carriers is obtained by applying the mapping individually to each of the pairs according to Table 6 and then concatenating. As result of the optimization, the codebook size is reduced from 80 to 24, since there are only 24 outstanding states remaining as shown in Table 8.

TABLE 8

| | | | |
| --- | --- | --- | --- |
| (A/A)/(A/A) | (A/N)/(A/N) | (D/D)/(N/A) | (N/A)/(N/N) |
| (A/A)/(A/N) | (A/N)/(D/D) | (D/D)/(N/N) | (N/N)/(A/A) |
| (A/A)/(D/D) | (A/N)/(N/A) | (N/A)/(A/A) | (N/N)/(A/N) |
| (A/A)/(N/A) | (A/N)/(N/N) | (N/A)/(A/N) | (N/N)/(D/D) |
| (A/A)/(N/N) | (D/D)/(A/A) | (N/A)/(D/D) | (N/N)/(N/A) |
| (A/N)/(A/A) | (D/D)/(A/N) | (N/A)/(N/A) | (N/N)/(N/N) |

The mapping relations may be modified by adding states as shown in the Table 9. Table 9 shows a mapping table for a single pair for reuse of an existing codebook.

TABLE 9

| Original states | Reported states | |
| --- | --- | --- |
| | Dual TX | Single TX |
| (D/D) | (D/D) | D |
| (D/A) | (D/D) | (A/A) |
| (D/N) | (D/D) | N |
| (A/D) | (D/D) | A |
| (A/A) | (A/A) | (A/A) |
| (A/N) | (A/N) | (A/N) |
| (N/D) | (D/D) | N |
| (N/A) | (N/A) | (N/A) |
| (N/N) | (N/N) | (N/N) |

Hence, the resulted codebook states reported to Node-B 420 may be obtained in Table 10. Table 10 shows reported HARQ-ACK states that may use the binary coding scheme specified in Table 2, which may be used to encode the states given in Table 10 to generate the ten bit HARQ-ACK message carried by HS-SCCH.

TABLE 10

| | | | | | |
| --- | --- | --- | --- | --- | --- |
| (A/N)/(A/N) | (A)/(A) | (A/A)/(A/A) | (D)/(N) | (N)/(N/A) | (N/A)/(N/N) |
| (A/N)/(D) | (A)/(A/A) | (A/A)/(A/N) | (D)/(N/A) | (N)/(N/N) | (N/N)/(A) |
| (A/N)/(N) | (A)/(A/N) | (A/A)/(D) | (D)/(N/N) | (N/A)/(A) | (N/N)/(A/A) |
| (A/N)/(N/A) | (A)/(D) | (A/A)/(N) | (N)/(A) | (N/A)/(A/A) | (N/N)/(A/N) |
| (A/N)/(N/N) | (A)/(N) | (A/A)/(N/A) | (N)/(A/A) | (N/A)/(A/N) | (N/N)/(D) |
| (D)/(A) | (A)/(N/A) | (A/A)/(N/N) | (N)/(A/N) | (N/A)/(D) | (N/N)/(N) |
| (D)/(A/A) | (A)/(N/N) | (A/N)/(A) | (N)/(D) | (N/A)/(N) | (N/N)/(N/A) |
| (D)/(A/N) | (A/A)/(A) | (A/N)/(A/A) | (N)/(N) | (N/A)/(N/A) | (N/N)/(N/N) |

In another embodiment, the pairwise grouped DTX report may be applied without the assistance of the network signaling, which may end up with the same reported state table as in Table 8. In this embodiment, the single carrier transmission within a pair may be blocked by the grouped DTX report. To avoid this blocking, restriction of transmission may be applied as suggested in the restricted transmission from the Node-B method, from which data transmission on one carrier within a pair may not be allowed.

In a third embodiment, a conditional DTX report converted from NACK is applied to consolidate the less-probable states by converting some NACKs to DTXs. For example, if a NACK is detected in one carrier, and if the number of NACKs among other carriers is greater than two, then DTX is reported for this carrier. Otherwise, the states remain unmodified. The mapping relations created are as follows in Table 11.

TABLE 11

| Original states | Reported states | Original states | Reported states | Original states | Reported states |
| --- | --- | --- | --- | --- | --- |
| D/D/D/A | D/D/D/A | A/D/D/A | A/D/D/A | N/D/D/A | N/D/D/A |
| D/D/D/N | D/D/D/N | A/D/D/N | A/D/D/N | N/D/D/N | D/D/D/D |
| D/D/A/D | D/D/A/D | A/D/A/D | A/D/A/D | N/D/A/D | N/D/A/D |
| D/D/A/A | D/D/A/A | A/D/A/A | A/D/A/A | N/D/A/A | N/D/A/A |
| D/D/A/N | D/D/A/N | A/D/A/N | A/D/A/N | N/D/A/N | D/D/A/D |
| D/D/N/D | D/D/N/D | A/D/N/D | A/D/N/D | N/D/N/D | D/D/D/D |
| D/D/N/A | D/D/N/A | A/D/N/A | A/D/N/A | N/D/N/A | D/D/D/A |
| D/D/N/N | D/D/D/D | A/D/N/N | A/D/N/N | N/D/N/N | D/D/D/D |
| D/A/D/D | D/A/D/D | A/A/D/D | A/A/D/D | N/A/D/D | N/A/D/D |
| D/A/D/A | D/A/D/A | A/A/D/A | A/A/D/A | N/A/D/A | N/A/D/A |
| D/A/D/N | D/A/D/N | A/A/D/N | A/A/D/N | N/A/D/N | D/A/D/D |
| D/A/A/D | D/A/A/D | A/A/A/D | A/A/A/D | N/A/A/D | N/A/A/D |
| D/A/A/A | D/A/A/A | A/A/A/A | A/A/A/A | N/A/A/A | N/A/A/A |
| D/A/A/N | D/A/A/N | A/A/A/N | A/A/A/N | N/A/A/N | D/A/A/D |
| D/A/N/D | D/A/N/D | A/A/N/D | A/A/N/D | N/A/N/D | D/A/D/D |
| D/A/N/A | D/A/N/A | A/A/N/A | A/A/N/A | N/A/N/A | D/A/D/A |
| D/A/N/N | D/A/D/D | A/A/N/N | A/A/D/D | N/A/N/N | D/A/D/D |
| D/N/D/D | D/N/D/D | A/N/D/D | A/N/D/D | N/N/D/D | D/D/D/D |
| D/N/D/A | D/N/D/A | A/N/D/A | A/N/D/A | N/N/D/A | D/D/D/A |
| D/N/D/N | D/D/D/D | A/N/D/N | A/D/D/D | N/N/D/N | D/D/D/D |
| D/N/A/D | D/N/A/D | A/N/A/D | A/N/A/D | N/N/A/D | D/D/A/D |
| D/N/A/A | D/N/A/A | A/N/A/A | A/N/A/A | N/N/A/A | D/D/A/A |
| D/N/A/N | D/N/A/A | A/N/A/N | A/N/A/A | N/N/A/N | D/D/A/A |
| D/N/A/N | D/D/A/D | A/N/A/N | A/D/A/D | N/N/A/N | D/D/A/D |
| D/N/N/D | D/D/D/D | A/N/N/D | A/D/D/D | N/N/N/D | D/D/D/D |
| D/N/N/A | D/D/D/A | A/N/N/A | A/D/D/A | N/N/N/A | D/D/D/A |
| D/N/N/N | D/D/D/D | A/N/N/N | A/D/D/D | N/N/N/N | D/D/D/D |
| A/D/D/D | A/D/D/D | N/D/D/D | N/D/D/D | | |

The number of reported states is reduced from 80 to 47, as shown in Table 12, where the outstanding states that Node-B 420 receives are listed.

TABLE 12

| | | | | | |
| --- | --- | --- | --- | --- | --- |
| A/A/A/A | A/D/A/A | A/N/A/A | D/A/D/D | D/D/D/N | N/A/A/D |
| A/A/A/D | A/D/A/D | A/N/A/D | D/A/D/N | D/D/N/A | N/A/D/A |
| A/A/A/N | A/D/A/N | A/N/D/A | D/A/N/A | D/D/N/D | N/A/D/D |

TABLE 12-continued

| | | | | | |
| --- | --- | --- | --- | --- | --- |
| A/A/D/A | A/D/D/A | A/N/D/D | D/A/N/D | D/N/A/A | N/D/A/A |
| A/A/D/D | A/D/D/D | D/A/A/A | D/D/A/A | D/N/A/D | N/D/A/D |

TABLE 12-continued

| | | | | | |
|---|---|---|---|---|---|
| A/A/D/N | A/D/D/N | D/A/A/D | D/D/A/D | D/N/D/A | N/D/D/A |
| A/A/N/A | A/D/N/A | D/A/A/N | D/D/A/N | D/N/D/D | N/D/D/D |
| A/A/N/D | A/D/N/D | D/A/D/A | D/D/D/A | N/A/A/A | |

The binary codewords specified in Table 2 may be used to encode the states given in Table 12 to generate the ten bit HARQ-ACK message carried by HS-SCCH. This is performed by identifying any mapping relations of the 47 states to entries of codeword table and then performing the encoding.

In another example of three carriers with one carrier configured in MIMO, let carrier C1, and carrier C2 denote two carriers without MIMO and let carrier C3 denote the carrier with MIMO, they are grouped as a pair (C1/C2). The carrier with MIMO may be handled as is without any further processing. The composite HARQ-ACK states are represented by (C1,C2)/C3. Table 13 shows possible combinations of the HARQ-ACK states for three carriers with one configured with MIMO, which has total of 62 entries.

TABLE 13

| | | | | | |
|---|---|---|---|---|---|
| (A/A)/A | (A/D)/N | (D/A)/AA | (D/D)/NN | (N/A)/D | (N/N)/A |
| (A/A)/AA | (A/D)/NA | (D/A)/AN | (D/N)/A | (N/A)/N | (N/N)/AA |
| (A/A)/AN | (A/D)/NN | (D/A)/D | (D/N)/AA | (N/A)/NA | (N/N)/AN |
| (A/A)/D | (A/N)/A | (D/A)/N | (D/N)/AN | (N/A)/NN | (N/N)/D |
| (A/A)/N | (A/N)/AA | (D/A)/NA | (D/N)/D | (N/D)/A | (N/N)/N |
| (A/A)/NA | (A/N)/AN | (D/A)/NN | (D/N)/N | (N/D)/AA | (N/N)/NA |
| (A/A)/NN | (A/N)/D | (D/D)/A | (D/N)/NA | (N/D)/AN | (N/N)/NN |
| (A/D)/A | (A/N)/N | (D/D)/AA | (D/N)/NN | (N/D)/D | |
| (A/D)/AA | (A/N)/NA | (D/D)/AN | (N/A)/A | (N/D)/N | |
| (A/D)/AN | (A/N)/NN | (D/D)/N | (N/A)/AA | (N/D)/NA | |
| (A/D)/D | (D/A)/A | (D/D)/NA | (N/A)/AN | (N/D)/NN | |

Table 14 shows a composite reduction mapping table for three carriers with one configured with MIMO. To optimize the codebook table, same processing, (i.e., grouped DTX reporting conditional on the network signaling), is applied to (C1/C2) according to Table 7, which generates the composite mapping shown in Table 14. One bit of network signaling may be used to indicate two modes including dual TX which indicates transmission over both carrier C1 and carrier C2, and single TX, which indicates transmission on one of the carriers in the pair.

TABLE 14

| original states | reported states | | Original states | reported states | |
|---|---|---|---|---|---|
| | dual TX | single TX | | dual TX | single TX |
| (A/A)/A | (A/A)/A | (A/A)/A | (D/D)/N | (D/D)/N | (D/D)/N |
| (A/A)/AA | (A/A)/AA | (A/A)/AA | (D/D)/NA | (D/D)/NA | (D/D)/NA |
| (A/A)/AN | (A/A)/AN | (A/A)/AN | (D/D)/NN | (D/D)/NN | (D/D)/NN |
| (A/A)/D | (A/A)/D | (A/A)/D | (D/N)/A | (D/D)/A | (N/N)/A |
| (A/A)/N | (A/A)/N | (A/A)/N | (D/N)/AA | (D/D)/AA | (N/N)/AA |
| (A/A)/NA | (A/A)/NA | (A/A)/NA | (D/N)/AN | (D/D)/AN | (N/N)/AN |
| (A/A)/NN | (A/A)/NN | (A/A)/NN | (D/N)/D | (D/D)/D | (N/N)/D |
| (A/D)/A | (D/D)/A | (A/A)/A | (D/N)/N | (D/D)/N | (N/N)/N |
| (A/D)/AA | (D/D)/AA | (A/A)/AA | (D/N)/NA | (D/D)/NA | (N/N)/NA |
| (A/D)/AN | (D/D)/AN | (A/A)/AN | (D/N)/NN | (D/D)/NN | (N/N)/NN |
| (A/D)/D | (D/D)/D | (A/A)/D | (N/A)/A | (N/A)/A | (N/A)/A |
| (A/D)/N | (D/D)/N | (A/A)/N | (N/A)/AA | (N/A)/AA | (N/A)/AA |
| (A/D)/NA | (D/D)/NA | (A/A)/NA | (N/A)/AN | (N/A)/AN | (N/A)/AN |
| (A/D)/NN | (D/D)/NN | (A/A)/NN | (N/A)/D | (N/A)/D | (N/A)/D |
| (A/N)/A | (A/N)/A | (A/N)/A | (N/A)/N | (N/A)/N | (N/A)/N |
| (A/N)/AA | (A/N)/AA | (A/N)/AA | (N/A)/NA | (N/A)/NA | (N/A)/NA |
| (A/N)/AN | (A/N)/AN | (A/N)/AN | (N/A)/NN | (N/A)/NN | (N/A)/NN |
| (A/N)/D | (A/N)/D | (A/N)/D | (N/D)/A | (D/D)/A | (N/N)/A |
| (A/N)/N | (A/N)/N | (A/N)/N | (N/D)/AA | (D/D)/AA | (N/N)/AA |
| (A/N)/NA | (A/N)/NA | (A/N)/NA | (N/D)/AN | (D/D)/AN | (N/N)/AN |
| (A/N)/NN | (A/N)/NN | (A/N)/NN | (N/D)/D | (D/D)/D | (N/N)/D |
| (D/A)/A | (D/D)/A | (A/A)/A | (N/D)/N | (D/D)/N | (N/N)/N |
| (D/A)/AA | (D/D)/AA | (A/A)/AA | (N/D)/NA | (D/D)/NA | (N/N)/NA |
| (D/A)/AN | (D/D)/AN | (A/A)/AN | (N/D)/NN | (D/D)/NN | (N/N)/NN |
| (D/A)/D | (D/D)/D | (A/A)/D | (N/N)/A | (N/N)/A | (N/N)/A |
| (D/A)/N | (D/D)/N | (A/A)/N | (N/N)/AA | (N/N)/AA | (N/N)/AA |
| (D/A)/NA | (D/D)/NA | (A/A)/NA | (N/N)/AN | (N/N)/AN | (N/N)/AN |
| (D/A)/NN | (D/D)/NN | (A/A)/NN | (N/N)/D | (N/N)/D | (N/N)/D |
| (D/D)/A | (D/D)/A | (D/D)/A | (N/N)/N | (N/N)/N | (N/N)/N |
| (D/D)/AA | (D/D)/AA | (D/D)/AA | (N/N)/NA | (N/N)/NA | (N/N)/NA |
| (D/D)/AN | (D/D)/AN | (D/D)/AN | (N/N)/NN | (N/N)/NN | (N/N)/NN |

Table 15 shows reported HARQ-ACK states for three carriers with one carrier in MIMO. The outstanding states remaining from the reduction mapping are given in Table 15, that are reported to Node-B 420.

TABLE 15

| | | |
|---|---|---|
| (A/A)/A | (A/N)/NA | (N/A)/N |
| (A/A)/AA | (A/N)/NN | (N/A)/NA |
| (A/A)/AN | (D/D)/A | (N/A)/NN |
| (A/A)/D | (D/D)/AA | (N/N)/A |
| (A/A)/N | (D/D)/AN | (N/N)/AA |
| (A/A)/NA | (D/D)/N | (N/N)/AN |
| (A/A)/NN | (D/D)/NA | (N/N)/D |
| (A/N)/A | (D/D)/NN | (N/N)/N |
| (A/N)/AA | (N/A)/A | (N/N)/NA |
| (A/N)/AN | (N/A)/AA | (N/N)/NN |
| (A/N)/D | (N/A)/AN | |
| (A/N)/N | (N/A)/D | |

Therefore the size of a codebook may be reduced from 62 to 34. If use of an existing codebook from an existing encoding scheme is desirable, (e.g. a scheme used in the 3GPP specifications), the reduction mapping for (C1/C2) may be performed according to Table 9, which leads to the final reported states similar to Table 10. At the last stage, the 48 states are coded to form a ten bit codeword according to the channel coding table specified in Table 2.

In a third example of four carriers with MIMO configured on two carriers, two carriers out of four may be configured with MIMO mode and the other two carriers are not configured with MIMO. For this case there are a total of 9*49−1=440 possible combinations in the HARQ-ACK table. Let carrier C1 and carrier C2 be the two carriers without MIMO. They are grouped to a pair and all possible combinations for the HARQ-ACK states related to this pair are treated by the same reduction mapping operation as specified in Table 4 based on the input of the Node-B 420 signaling. Since there are five outstanding states in Table 4, the total number of the composite HARQ-ACK states merging the carriers, with or without MIMO, may be reduced to 5*49−1=244 after the reduction effort. Therefore, the size of codebook is reduced from 440 to 244.

Knowing the number of carriers that are transmitting data is useful to minimize the loss due to the grouped DTX reporting. The Node-B 420 indicates carrier activity to the WTRU 410, which will be described in greater detail hereafter. The WTRU 410 detects the indication from the Node-B 420, and applies the appropriate codebook compression to the HARQ-ACK field in the corresponding HS-SCCH.

The carrier activity may be indicated, for example, using the HS-SCCH. For example, the new data indicator bit may be reused. In another embodiment, the carrier activity information is provided over the HS-SCCH type 1 in place of the new data indicator bit. Alternatively, the HS-SCCH Type 3 format for single transport block is used for the HS-DSCH transmission. Since MIMO mode may not be configured when performing the grouped DTX reporting, some signaling bits used for MIMO may be used for reporting the carrier activities. The bits may include, for example $x_{wipb1}$, $x_{pwipb2}$, $x_{ma8}$, or $x_{ccs7}$.

Optionally, a HS-SCCH Type 3 format for two transport blocks may be used, where the additional information fields for the secondary transport block may be used to send configuration information duplicated from another carrier in the pair.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit comprising:
a receiver configured to receive a first High-Speed Downlink Shared channel (HS-DSCH) signal on a primary serving cell, a second HS-DSCH signal on a first secondary serving cell, a third HS-DSCH signal on a second secondary serving cell, and a fourth HS_DSCH signal on a third secondary serving cell,
circuitry configured to:
generate a first hybrid automatic repeat request acknowledgement (HARQ-ACK) feedback relating to the first HS-DSCH signal and the second HS-DSCH signal and a second HARQ-ACK feedback relating to the third HS-DSCH signal and the fourth HS-DSCH signal; and
concentrate the first HARQ-ACK feedback and the second HARQ-ACK feedback; and
a transmitted configured to transmit the concatenated first HARQ-ACK feedback and the second HARQ-ACK feedback over a single uplink carrier.

2. The wireless transmit/receive unit of claim 1, wherein the concatenated first HARQ-ACK feedback and the second HARQ-ACK feedback are transmitted via a high speed dedicated physical control channel (HS-DPCCH) with a spreading factor of 128.

3. The wireless transmit/receive unit of claim 1, wherein the circuitry is further configured to generate a first channel quality indicator (CQI) relating to a first pair of serving cells and a second CQI relating to a second pair of serving cells.

4. The wireless transmit/receive unit of claim 3, wherein the circuitry is further configured to transmit the first CQI and the second CQI over the single uplink carrier.

5. The wireless transmit/receive unit of claim 4, wherein the first CQI and the second CQI are combined into a high speed dedicated physical control channel (HS-DPCCH).

6. The wireless transmit/receive unit of claim 1, wherein the concatenated comprises time-multiplexing the first HARQ-ACK feedback and the second HARQ-ACK feedback.

7. The wireless transmit/receive unit of claim 1, wherein the circuitry is further configured to generate a state reduction, wherein the state reduction maps actual hybrid automatic repeat request-acknowledgement states to reported hybrid automatic repeat request-acknowledgement states of a smaller set.

8. A method implemented in a wireless transmit/receive unit, the method comprising:
receiving a first High-Speed Downlink Shared channel (HS-DSCH) signal on a primary serving cell, a second HS-DSCH signal on a first secondary serving cell, a third HS-DSCH signal on a second secondary serving cell, and a fourth HS-DSCH signal on a third secondary serving cell;
generating a first HARQ-ACK feedback relating to the first HS-DSCH signal and the second HS-DSCH signal and a second HARQ-ACK feedback relating to the third HS-DSCH signal and the fourth HS-DSCH signal;
concatenated the first HARD-ACK feedback and the second HARD-ACK feedback; and
transmitting the first HARQ-ACK feedback and the second HARQ-ACK feedback over a single uplink carrier.

9. The method of claim 8, wherein the concatenated first HARQ-ACK feedback and the second HARQ-ACK feedback are transmitted via a high speed dedicated physical control channel (HS-DPCCH) with a spreading factor of 128.

10. The method of claim 8, further comprising generating a first CQI relating to a first pair of serving cells and a second CQI relating to a second pair of serving cells.

11. The method of claim 10, further comprising transmitting the first CQI and the second CQI over the single uplink carrier.

12. The method of claim 11, wherein the first CQI and the second CQI are combined into a high speed dedicated physical control channel (HS-DPCCH).

13. The method of claim 8, wherein the concatenating comprises time-multiplexing the first HARQ-ACK feedback and the second HARQ-ACK feedback.

14. The method of claim 8, further comprising generating a state reduction, wherein the state reduction maps actual hybrid automatic repeat request-acknowledgement states to reported hybrid automatic repeat request-acknowledgement states of a smaller set.

* * * * *